(12) United States Patent
Han et al.

(10) Patent No.: US 12,455,616 B1
(45) Date of Patent: Oct. 28, 2025

(54) DEVICES AND METHODS FOR PRESERVING SCOTOPIC VISION FOR A DISPLAY DEVICE USER

(71) Applicant: Google LLC, Mountain View, CA (US)

(72) Inventors: Jennifer Sy-en Han, Palo Alto, CA (US); Brian Watson Cranton, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/648,820

(22) Filed: Apr. 29, 2024

(51) Int. Cl.
*G06F 3/01* (2006.01)
*G09G 3/00* (2006.01)
*G06F 3/14* (2006.01)
*G06F 3/16* (2006.01)

(52) U.S. Cl.
CPC ............. *G06F 3/011* (2013.01); *G09G 3/001* (2013.01); *G06F 3/14* (2013.01); *G06F 3/16* (2013.01); *G09G 2320/0666* (2013.01)

(58) Field of Classification Search
CPC ... G06F 3/011; G06F 3/14; G06F 3/16; G09G 3/001; G09G 2320/0666
USPC .......................................................... 345/156
See application file for complete search history.

(56) References Cited

U.S. PATENT DOCUMENTS

| 11,989,359 B1 * | 5/2024 | Bravo | G06F 3/0383 |
|---|---|---|---|
| 2013/0040708 A1 | 2/2013 | Gustavsson | |
| 2017/0105262 A1 * | 4/2017 | Liu | H05B 45/20 |
| 2020/0082791 A1 | 3/2020 | Petrie | |
| 2021/0379992 A1 * | 12/2021 | Domeyer | B60K 35/60 |
| 2023/0317021 A1 * | 10/2023 | Eash | G09G 3/32 |
| | | | 345/102 |
| 2024/0053612 A1 * | 2/2024 | Robaina | B60K 35/60 |
| 2024/0284085 A1 * | 8/2024 | Vastare | H04M 1/724097 |

FOREIGN PATENT DOCUMENTS

DE        102017103922 B3  *  7/2018   ........... G06F 3/1423

OTHER PUBLICATIONS

DE 102017103922 English Translation (Year: 2018).*
"Soundoff Signal Provides Lighting Solutions To Protect Night Vision", NTEA The Work Truck Association, Aug. 10, 2023, 5 pages.

* cited by examiner

*Primary Examiner* — Benjamin C Lee
*Assistant Examiner* — Nathan P Brittingham
(74) *Attorney, Agent, or Firm* — Brake Hughes Bellermann LLP

(57) ABSTRACT

An illustrative display device preserves scotopic vision for a user. The display device includes a display configured to present image content, a memory storing instructions and operating parameters, and a processor coupled to the memory and configured to execute the instructions. The operating parameters may include a color parameter and an additional parameter, such that the execution of the instructions allows the processor to switch the display device between: 1) a normal operating mode in which the color parameter is set to cause the display to present the image content in full color and the additional parameter is set to a first setting, and 2) a scotopic preservation mode in which the color parameter is set to cause the display to present the image content in red color and the additional parameter is set to a second setting different from the first setting. Corresponding methods and devices are also disclosed.

20 Claims, 14 Drawing Sheets

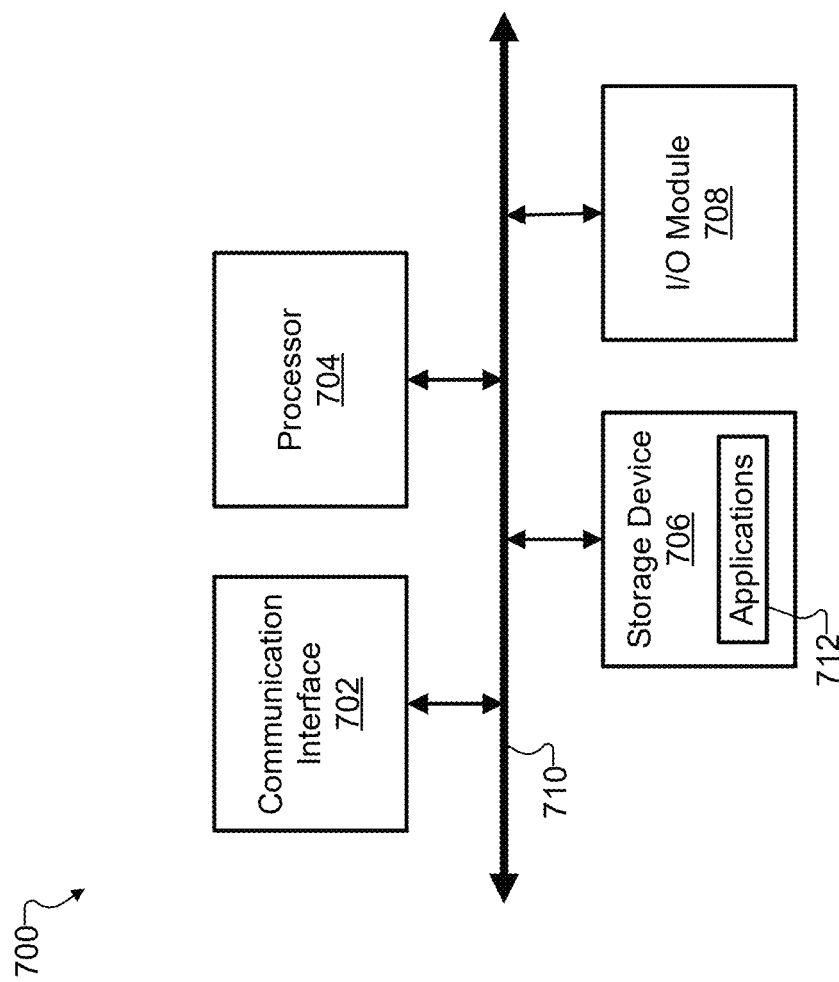

DEVICES AND METHODS FOR PRESERVING SCOTOPIC VISION FOR A DISPLAY DEVICE USER

BACKGROUND

Human vision is a complex process that relies on the coordinated effort of several components in the eye. Among these components are photoreceptor cells called rods and cones that are disposed on the retina and function to convert light into electrical signals to be interpreted by the brain. Rods are highly sensitive to low-light conditions and detect shades of gray, rather than color. In contrast, cones are sensitive to particular color ranges (red, green, or blue) and allow for full color viewing when light is bright enough. Photopic vision (also referred to as day vision) therefore relies heavily on the cone cells of the retina, while scotopic vision (also referred to as night vision) relies more heavily on the rod cells. Depending on environmental conditions and various other factors, the vision system of a particular person may operate either with photopic vision or with scotopic vision. Switching between these two basic modes of vision, however, is not a process that the eyes and brain perform instantaneously.

SUMMARY

Devices and methods for preserving scotopic vision for a user of a display device are described herein. Since it may be much easier and faster for a user of a display device to switch from scotopic vision to photopic vision than to switch the other direction, it may be desirable for display devices to be sensitive to when the user has attained good scotopic vision and to take care not to spoil this visual state unnecessarily (i.e., not to force the user to switch from the scotopic visual state into the photopic visual state). Additionally, it may be helpful for other settings to be adjusted in conjunction with the user's mode of vision and the types of activities the user is likely to be engaged in when in these different visual states. For example, for various nighttime activities that will be described, it may not only be desirable for a primary display to preserve the user's scotopic vision, but also for other associated lights of the device and/or additional devices in the vicinity to be dimmed or darkened, for sounds emitted by the device to be silenced, and so forth. As another example, it may be desirable during many nighttime activities for notifications to be suspended so as not to distract the user or lead to a loss of concentration. Accordingly, implementations described herein facilitate effective low-light usage of display devices by detecting and preserving scotopic vision and adjusting associated device parameters to settings appropriate for the circumstances.

To this end, one implementation described herein involves a display device including various components that collectively function to preserve scotopic vision for a user of the display device. For example, these components may include: 1) a display configured to present image content; 2) a memory storing instructions and operating parameters for the display device, the operating parameters including a color parameter and an additional parameter; and 3) a processor communicatively coupled to the memory and configured to execute the instructions to switch the display device between a normal operating mode and a scotopic preservation mode. In the normal operating mode, the color parameter may be set to cause the display to present the image content in full color and the additional parameter may be set to a first setting (e.g., to allow non-private sound, to allow notifications, etc.). Conversely, in the scotopic preservation mode, the color parameter may be set to cause the display to present the image content in red color (which, as described in more detail below, does not produce the adverse effects on scotopic vision that higher frequencies of light do) and the additional parameter may be set to a second setting different from the first setting (e.g., to disallow non-private sound, to disallow notifications, etc.).

Another example implementation described herein involves a method for preserving scotopic vision for a display device user. A first operation of this method, for instance, may involve determining, by a display device operating in a normal operating mode in which a color parameter is set to cause a display of the display device to present image content in full color and an additional parameter is set to a first setting, that scotopic vision of a user of the display device is to be preserved. Then, based on the determining that the scotopic vision is to be preserved, a second operation of the method may involve switching the display device from operating in the normal operating mode to operating in a scotopic preservation mode in which the color parameter is set to cause the display to present the image content in red color and the additional parameter is set to a second setting different from the first setting.

Yet another example implementation described herein involves a non-transitory computer-readable medium storing instructions that, when executed, cause a processor of a display device to perform a process. The process may include, for example, 1) determining, while the display device is operating in a normal operating mode in which a color parameter is set to cause a display of the display device to present image content in full color and an additional parameter is set to a first setting, that scotopic vision of a user of the display device is to be preserved; and 2) switching, based on the determining that the scotopic vision is to be preserved, the display device from operating in the normal operating mode to operating in a scotopic preservation mode in which the color parameter is set to cause the display to present the image content in red color and the additional parameter is set to a second setting different from the first setting.

Various additional operations may be added to these processes and methods as may serve a particular implementation, examples of which will be described in more detail below. Additionally, it will be understood that each of implementations described in the examples above (e.g., the display device, the method, the non-transitory computer readable medium, etc.) may additionally or alternatively be performed by other types of implementations as well. For example, a process described above as being included in a computer readable medium could be performed as a method or could be performed by at least one processor of a display device. Similarly, the method set forth above could be encoded in instructions stored by a computer readable medium or stored within a memory of a display device, and so forth.

The details of these and other implementations are set forth in the accompanying drawings and the description below. Other features will also be made apparent from the following description, drawings, and claims.

BRIEF DESCRIPTION OF THE DRAWINGS

FIG. 7 shows an illustrative computing system that may be used to implement various devices and/or systems described herein.

DETAILED DESCRIPTION

Figure 1:
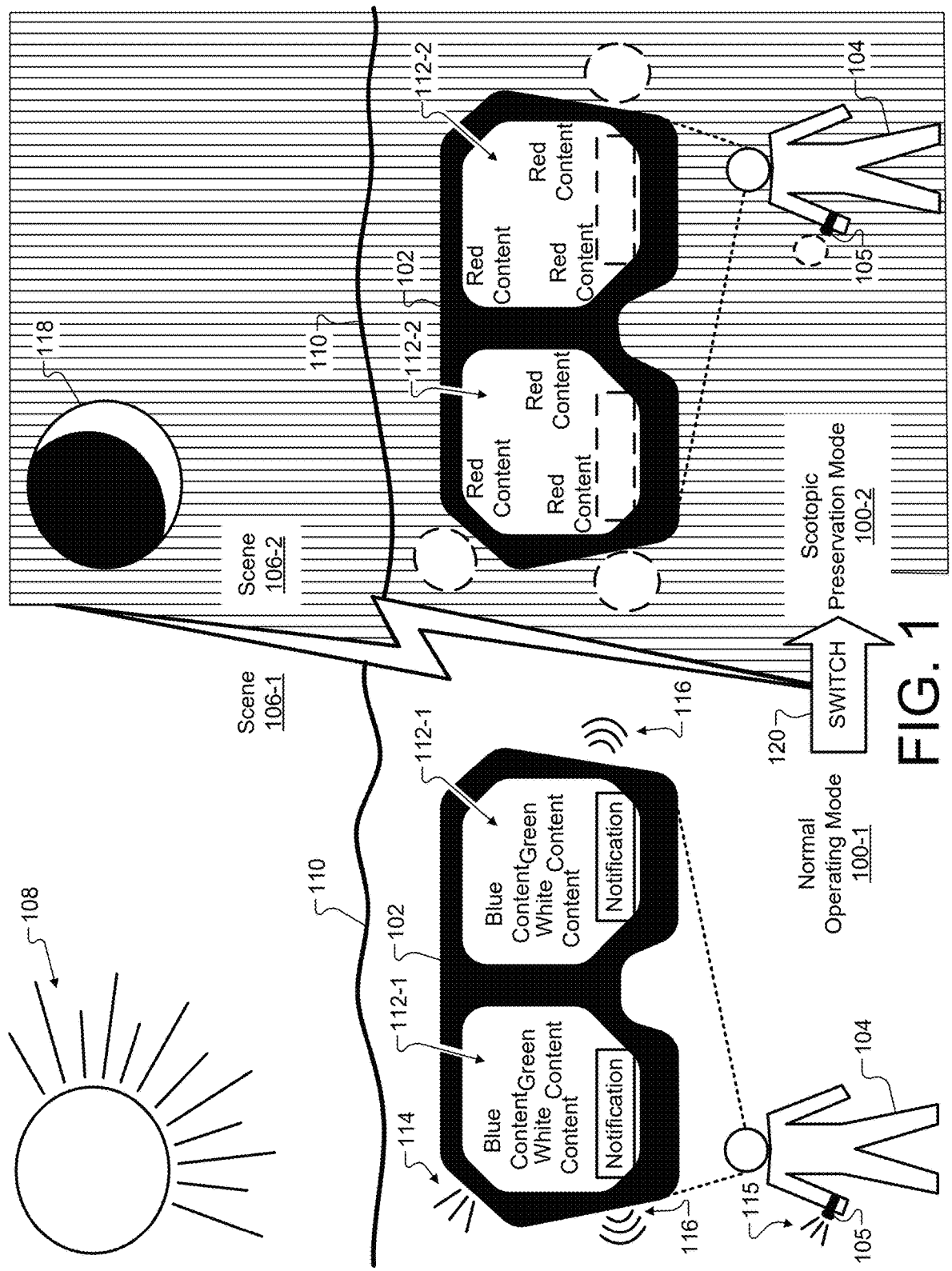
FIG. 1 shows certain operational aspects of an illustrative implementation of a display device configured to preserve scotopic vision for a user in accordance with principles described herein.

Systems and methods for preserving scotopic vision for a user of a display device are described herein. As noted above, the brain is not able to switch instantaneously from one vision mode to another, even if environmental conditions themselves may change very quickly (e.g., bright lights can be turned on in a room, a person can walk from a bright outdoor scene to a dim indoor scene, etc.). Moreover, as a result of the diurnal biological makeup of humans, there may be a significant asymmetry in how long it takes to adapt from photopic to scotopic vision versus adapting from scotopic to photopic vision. Specifically, for example, a typical person may be able to fully adapt from scotopic vision to photopic vision in less than five minutes while taking as long as 30 minutes to fully adapt from photopic vision to scotopic vision.

These adaptation times and the asymmetry between them may lead to a technical problem for display devices configured to present display content that includes light capable of causing a user to lose their scotopic vision and adapt to their photopic vision. Specifically, once a user of a device has fully adapted to their scotopic vision (which, again, may take a significant period of time, such as 30 minutes), such devices may inadvertently cause the scotopic vision to be lost or at least significantly degraded in mere seconds of displaying particular types of light (e.g., bright light, relatively high frequency light, etc., as will be described in more detail below). This problem is of particular concern for certain portable devices that are likely to be used in a variety of different locations (e.g., indoor and outdoor locations, etc.), used under a variety of different lighting conditions (e.g., at different times of day, with different types of lighting, etc.), and/or used while engaged in a variety of different activities. In particular, the risk of spoiling a user's scotopic vision may be especially prevalent for devices that are used habitually, continually, and/or as an extension or correction of the user's senses.

As one example, a pair of augmented reality glasses could be worn by a user during the course of their regular activities, sometimes even providing prescription lenses that fill the role of traditional prescription glasses in helping the user see the world clearly. For a wearable device such as glasses, the user may not have the luxury of just putting the device away to ensure that it does not inadvertently spoil their scotopic vision (at least not if they wish to see the world clearly through their prescription). Moreover, even if putting the device away is an option, it may be easy for the user to forget that they are wearing the glasses until it is too late and their scotopic vision has been degraded or lost as a consequence of their exposure to bright or high-frequency light.

At best, the unwanted loss or degradation of scotopic vision may be inconvenient or irritating for a user that has gone through the long adaptation process to achieve good scotopic vision. For example, a user who is stargazing on a dark night may spend 30 minutes adjusting their eyes to see the constellations clearly just to have an unexpected (and perhaps unimportant) notification pop up and initiate an undesirable transition to photopic vision that is only reversible by the slow process of re-achieving the scotopic vision.

In other situations, the stakes may be higher than mere inconvenience or annoyance. For example, loss of scotopic vision may inhibit the user's performance at an activity they are engaged in (e.g., a person hunting at night may lose their ability to see the target of the hunting activity if they cannot reliably preserve their scotopic vision) or may even face a safety concern (e.g., a person driving a boat at night may need to cease this activity temporarily if they feel they cannot see well enough to drive safely after their scotopic vision is lost).

One important part of good night vision is that the pupils enlarge to admit what little light there is at the scene. The pupils can react to changes in the volume and brightness of light in seconds, especially when contracting in response to a sudden influx of relatively bright light. Another part of scotopic vision, however, is the reliance on rods around the periphery of the retina rather than the cones in more central regions. This aspect of vision adaptation is sensitive not only to brightness of light but also frequency. For example, it is known that low-frequency light (e.g., red light with long wavelengths above, for example, 600 nanometers (nm), 615 nm, 630 nm, 640 nm, etc.) does not have the same effect as higher-frequency light (e.g., green and blue frequencies of light) in triggering adaptation out of scotopic vision and toward photopic vision.

Accordingly, while night-mode or dark-mode settings available with certain conventional displays and devices may be useful for reducing screen brightness and/or suppressing high-frequency (e.g., blue) light that might otherwise cause eye strain or interfere with sleep cycles, this type of approach to night presentation may fail to preserve scotopic vision. Moreover, as such conventional night modes are typically triggered manually or based on time-of-day information, these modes may also fail to correlate well with actual scotopic vision being achieved by the user.

Implementations described herein present technical solutions to the technical problems of determining when scotopic vision is achieved and of then operating in a way that preserves and enhances that scotopic vision and the activities associated with it. For example, as will be described in more detail below, implementations described herein may keep track of and use various sensor data (e.g., from ambient light sensors, world-facing cameras, etc.), contextual or environmental data (e.g., location information, time-of-day information, meteorological information, etc.), historical data (e.g., past behavioral data of the user, etc.), and/or other available information to determine when a user of a display device is likely to have achieved partial or full use of their scotopic vision.

Based on the determination that scotopic vision is to be preserved, implementations described herein may then transition to (and operate in) a scotopic preservation mode in which the display device behaves in a manner that helps preserve, encourage, and enhance that scotopic vision. For example, since the rod cells upon which scotopic vision relies are most sensitive to blue-green wavelengths (e.g., around 500 nm) and are not sensitive around red wavelengths (e.g., around 640 nm), the display device may continue to convey visual information while keeping the rods active by using only red illumination to which the rods are insensitive. In this way, the eyes' red-sensitive cones can observe red light without deactivating the rods.

Moreover, along with adjusting the display of the display device such that visual content being displayed is converted to use various shades of long wavelength red light, the scotopic preservation mode may also involve adjusting one or more other settings to further help preserve and enhance the user's scotopic vision and/or activities they may be engaged in with their scotopic vision. As one example, settings may be adjusted to eliminate additional sources of (at least non-red) light other than the light from the display itself. For instance, indicator lights (e.g., light emitting diodes (LEDs) indicating power, communication, and/or other status), illuminated or backlit buttons, additional devices with their own displays and light sources (devices such as smart watches or extended reality controller device that are connected to and able to be influenced by the display device), and other such light sources may also be directed to cease emitting light (e.g., all light or at least light with non-red wavelengths). As another example, settings may be adjusted to reduce or eliminate non-private sound sources (e.g., sound that can be heard by anyone in the vicinity rather than heard privately over connected headphones), since the scotopic vision may be achieved in furtherance of an activity in which non-private sound could interfere (e.g., night hunting, fishing, etc.). As yet another example, settings may be adjusted to suppress or deemphasize certain information (e.g., non-critical notifications, all notifications, all visual content, etc.) that is likely to distract from activities requiring concentration and stillness (e.g., stargazing, night driving, hunting, etc.). In some such instances, audio (e.g., private audio presented by headphones) may be relied on for user interaction with the display device. An audio-only mode, a haptics-only mode, or another such mode that combines audio, tactile, and/or other non-visual interactive elements could be employed for certain tasks (e.g., by certain applications on the display device, etc.) and/or for a certain time period (e.g., for the duration of the scotopic preservation mode period).

Implementations of these and other disclosed technical solutions to the technical problem of detecting and preserving scotopic vision may result in various technical effects and benefits, as will be made apparent below. Among these technical effects, for example, is that devices may be used in various situations without risk of inadvertently causing problems related to loss of scotopic vision. While in some examples a user may manually direct the display device to switch to scotopic preservation mode (as described in more detail below), the determination that scotopic vision is to be preserved may be made automatically in other examples so that the scotopic preservation mode may be engaged proactively, anticipatorily, and/or otherwise with minimal risk of the user inadvertently degrading their scotopic vision (e.g., before they realize that scotopic preservation mode is needed or as they interact with settings menus to manually trigger the scotopic preservation mode). Accordingly, the user may wear or otherwise use their display device during activities in which scotopic vision is desirable with confidence that the display device will be operational and useful while taking care to preserve the scotopic vision.

Various implementations will now be described in more detail with reference to the figures. It will be understood that particular implementations described below are provided as non-limiting examples and may be applied in various situations. Additionally, it will be understood that other implementations not explicitly described herein may also fall within the scope of the claims set forth below. Systems and methods described herein for preserving scotopic vision for a display device user may result in any or all of the technical effects mentioned above, as well as various additional effects and benefits that will be described and/or made apparent below.

FIG. 1 shows certain operational aspects of an illustrative implementation of a display device configured to preserve scotopic vision for a user in accordance with principles described herein. As shown, a normal operating mode 100-1 for a display device 102 is shown on a left-hand side of FIG. 1, while a scotopic preservation mode 100-2 for display device 102 is shown on the right-hand side. In the example of FIG. 1, display device 102 is shown to be implemented as an augmented reality head-mounted device configured to present augmented reality content. As such, display device 102 may be worn on a head of a user 104 who, in this example, also happens to be wearing a smart watch 105 as the user experiences different environments such as an environment of a scene 106-1 (e.g., a daytime scene associated with normal operating mode 100-1) and an environment of a scene 106-2 (e.g., a nighttime scene associated with scotopic preservation mode 100-2). These scenes 106-1 and 106-2 may include the same environment at different times of day. For example, a sun 108 is shown to be up during the day as user 104 uses display device 102 to look at a horizon 110 of the landscape in normal operating mode 100-1. Then, once sun 108 sets and night arrives, a moon 118 is shown to represent the night as user 104 uses display device 102 to look at the same or similar landscape in the scotopic preservation mode 100-2 (also including horizon 110).

Display device 102 is shown to include a display that, in the head-mounted display form factor, is composed of two separate sub-displays (one for the left eye and one for the right eye) with similar content (e.g., identical content, stereoscopically-related content intended for each eye to give a 3D effect, etc.). For an augmented reality head-mounted display such as display device 102, the display may be implemented as a transparent display configured to combine ambient light passing through the display with display light carrying image content labeled as image content 112-1 in normal operating mode 100-1 and as image content 112-2 in scotopic preservation mode 100-2. As shown, image content 112-1 may be full color content utilizing colors across the visible spectrum. For example, as shown, image content 112-1 may include blue content, green content, white content, and so forth. In contrast, image content 112-2 in scotopic preservation mode 100-2 is shown to display all content only with long red wavelengths, such that the "Blue Content," the "Green Content," and the "White Content" of image content 112-1 is all converted to "Red Content" in image content 112-2.

Besides converting the visual content on the transparent display from full color to red, FIG. 1 also shows how other parameters may also be adjusted to different settings in normal operating mode 100-1 and in scotopic preservation mode 100-2. It will be understood that all of the following parameter changes may be implemented in some implementations of the scotopic preservation mode 100-2, while fewer than all of them may be implemented in other examples.

As a first example parameter that may be changed, a notification ("Notification") is shown within image content 112-1 to be presented on the display when display device 102 is in the normal operating mode 100-1. In contrast, a dashed-line box is depicted in image content 112-2 to emphasize that this notification may no longer be presented on the display when display device 102 is in the scotopic preservation mode 100-2. One reason that notifications may be suppressed during scotopic preservation mode 100-2 is that an unexpected notification that is presented in full color (e.g., using a white background, etc.) could degrade the scotopic vision of user 104 in an undesirable way. However, even if notifications, like other image content presented by the display, are presented using only red light, it still may be undesirable for some or all notifications to be presented when user 104 is engaged in activities involving scotopic vision. For example, user 104 could be trying to fall asleep, could be driving a car or a boat, could be stargazing, could be hiking, could be hunting or fishing, could be engaged in surveillance activities, or the like. In any of these or other examples, it may not be a convenient time for user 104 to receive notifications, especially those that include non-critical information (e.g., a news article, a social media reminder, an advertisement, etc.). Accordingly, part of scotopic preservation mode 100-2 may be to suppress some or all of the notifications as shown.

Other example parameters that may be changed in certain implementations are illustrated by extra-display light sources such as a light source 114 and a light source 115 that are separate from the display of display device 102. While light sources 114 and 115 are shown to be present when display device 102 is in the normal operating mode 100-1, respective dashed-line circles emphasize that light sources 114 and 115 are absent (e.g., turned off, dimmed, suppressed, etc.) when display device 102 is in the scotopic preservation mode 100-2. Light sources 114 and 115 may represent any extra-display light source (i.e., any light source other than the main display of the display device 102). For example, light source 114 may represent one or more indicator LEDs of the display device 102 that are illuminated during the normal operating mode 100-1 to indicate that the device is powered on, that the device is connected to a network, that the device is communicating data, or the like. As another example, light source 114 may represent one or more buttons of the display device 102 that are backlit or otherwise illuminated (to increase visibility of the button when the user wants to press it). As yet another example, light source 115 may represent non-red light emitted by an additional device that is separate from display device 102, such as smart watch 105. While such features may be desirable and useful during normal operating mode 100-1, it may not be desirable for any light (or at least any non-red light) to be emitted in the scotopic preservation mode 100-2, so a parameter that controls such lights may be set to disallow them or otherwise make them more suitable for scotopic preservation (e.g., by converting their light to red wavelengths, by dimming the luminance significantly, etc.).

Another example parameter that may be changed in certain implementations is illustrated by a non-private sound 116 that is shown to be present when display device 102 is in the normal operating mode 100-1 and is emphasized as being absent (by dashed-line circles) when display device 102 is in the scotopic preservation mode 100-2. Non-private sound 116 may represent a beeping sound, a ringtone for an incoming call or message, audio associated with video or other content being presented on display device 102, or the like. In any of these cases, sound may be appropriate during daytime hours that may be undesirable when scotopic vision activities such as those enumerated above are being engaged in. Accordingly, all audio output may be suppressed in some implementations and at least non-private sound may be suppressed in others (thereby allowing the user to still hear audio privately such as through personal headphones or the like).

Another example parameter that may be changed in certain implementations is illustrated by the different placement of full color image content 112-1 ("Blue Content," "White Content" and "Green Content") and the corresponding, red-colored image content 112-2 (corresponding instances of "Red Content") on the display. As shown, while image content 112-1 is more centralized for viewing by the cones, image content 112-2 is intentionally pushed toward the periphery of the display to avoid engaging the cones and to be more easily viewed by the rods (which are disposed on the periphery of the retina).

While these few examples are explicitly illustrated in FIG. 1 and will be described in more detail below, it will be understood that other parameter adjustments (settings changes) could also be associated with a switch 120 from normal operating mode 100-1 to scotopic preservation mode 100-2. Certain examples are mentioned herein or may be applied as appropriate for a given application or implementation. It will also be understood that various factors and bases may be considered for the triggering of the switch 120 between the modes (e.g., from normal operating mode 100-1 to scotopic preservation mode 100-2 as shown in FIG. 1 or in the other direction as will be described and illustrated in more detail below). Indeed, implementations described herein include both novel techniques for determining when switch 120 is to be performed as well as novel aspects of how the behavior of display device 102 is different in the scotopic preservation mode 100-2 as compared to the normal operating mode 100-1.

Figure 2:
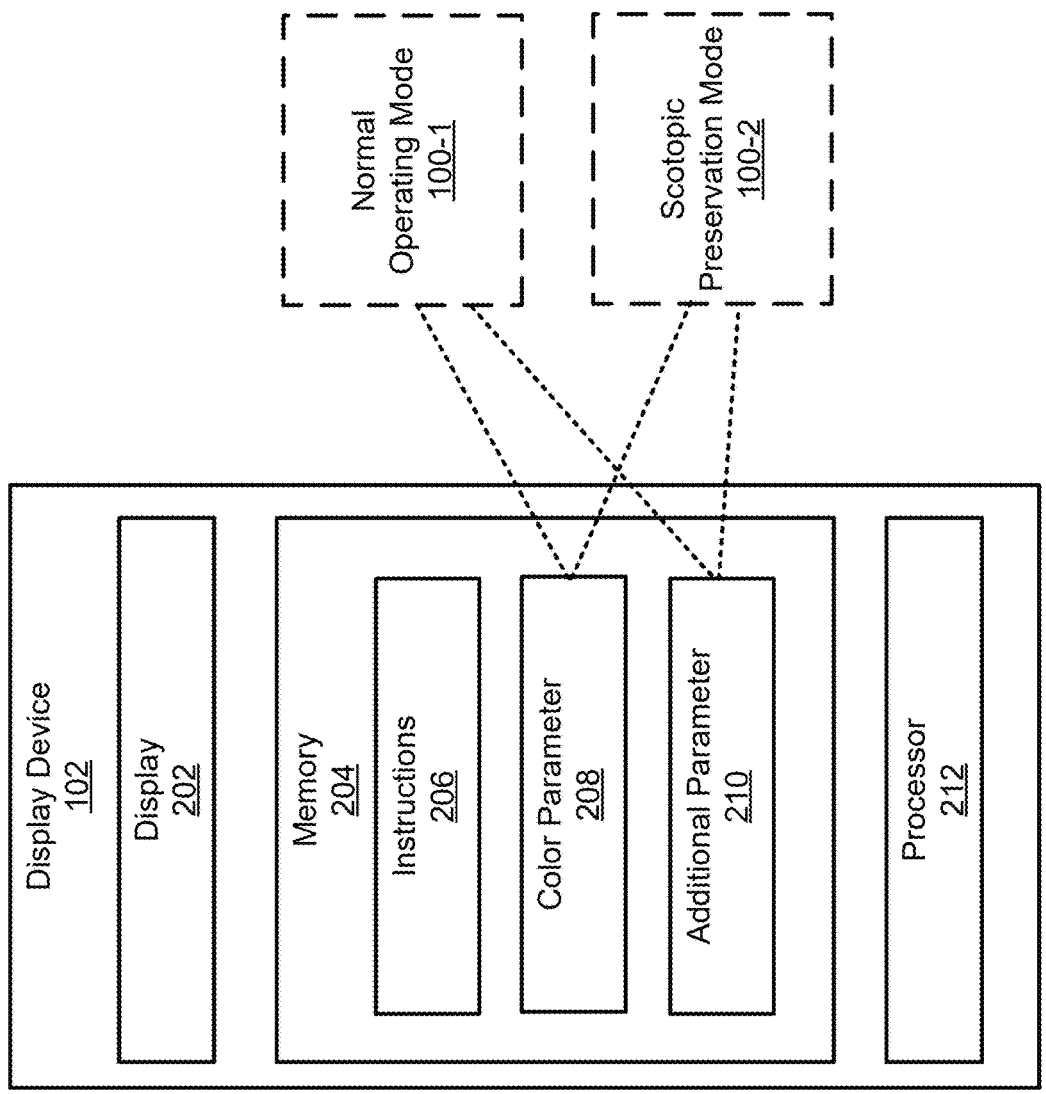
FIG. 2 shows certain component parts of a display device configured to preserve scotopic vision for a user in accordance with principles described herein.

FIG. 2 shows certain component parts of an implementation of display device 102 that is configured to preserve scotopic vision for a user (e.g., user 104, not shown in FIG. 2) in accordance with principles described herein. As shown, this implementation of display device 102 includes: a display 202 that may be configured to present image content; a memory 204 that stores instructions 206 and operating parameters for the display device, the operating parameters including a color parameter 208 and an additional parameter 210; and a processor 212 that may be communicatively coupled to memory 204 and configured to execute instructions 206 to switch display device 102 between normal operating mode 100-1 and scotopic preservation mode 100-2. In normal operating mode 100-1, color parameter 208 may be set to cause display 202 to present image content in full color and additional parameter 210 may be set to a first setting (a setting such as described above, depending on what the parameter controls). Conversely, in scotopic preservation mode 100-2, color parameter 208 may be set to cause display 202 to present the image content in red color and additional parameter 210 may be set to a second setting different from the first setting. Dotted lines extending from color parameter 208 and additional parameter 210 in FIG. 2 illustrate how these and potentially other operating parameters stored in memory 204 (not explicitly shown) may be set to different values to put display device 102 into the different operating modes. As such, changing the settings of these parameters may serve to switch the display device 102 from operating in one mode to the other (e.g., from normal operating mode 100-1 to scotopic preservation mode 100-2 or vice versa).

Implementations of display device 102 may have any suitable form factor. For example, as described and illustrated above in relation to FIG. 1, one implementation of display device 102 may be an extended reality head-mounted display (e.g., a pair of augmented reality glasses, etc.) that implements display 202 as a pair of transparent sub-displays (also known as see-through displays) for each eye of the user, such as by being integrated with each side of the wearable device (e.g., each lens of the glasses). In other example implementations, display device 102 could be a portable device with a form factor such as a smartphone or tablet form factor. In these cases, display 202 may be implemented by a standard (non-transparent) display screen of the portable device. Principles described herein may apply to still other types of implementations and form factors, including head-mounted displays with video pass through (i.e., non-transparent displays), computer monitors, televisions, electronic reading devices, smart watches, and so forth.

Implementations described herein for display device 102 may function to preserve scotopic vision for a user of the display device by combining software elements, algorithmic elements, and hardware elements. For example, software aspects of display device 102 (embodied in instructions 206) may be configured to enable both normal operating mode 100-1 and scotopic preservation mode 100-2 to present full color and functionality when appropriate while also preserving scotopic vision and reducing the functionality of the device when that is likely to be desirable. Algorithmic aspects of display device 102 (also embodied in instructions 206) refer to predictive measures that may serve to proactively anticipate when the user is likely to appreciate or benefit from automatic engagement or disengagement of scotopic preservation mode 100-2. In some examples, user interface elements (e.g., haptics, switches, audio cues, etc.) may help guide the interaction between the user and display device 102 without degrading scotopic adaptation. For instance, these elements may allow the user to manually switch to scotopic preservation mode 100-2 in a manner that obviates the need to interact with a bright user interface that could include high frequency (blue and/or green) light likely to degrade the user's scotopic vision. Hardware aspects of display device 102 may include not only processor 212 (which, as mentioned, may execute instructions 206 to implement the software and algorithmic aspects described above) but may also include other hardware elements not explicitly shown in FIG. 2 (e.g., sensors such as ambient light sensors or world-facing cameras; user interface elements such as buttons, haptics, and touchscreens; etc.).

Figure 3:
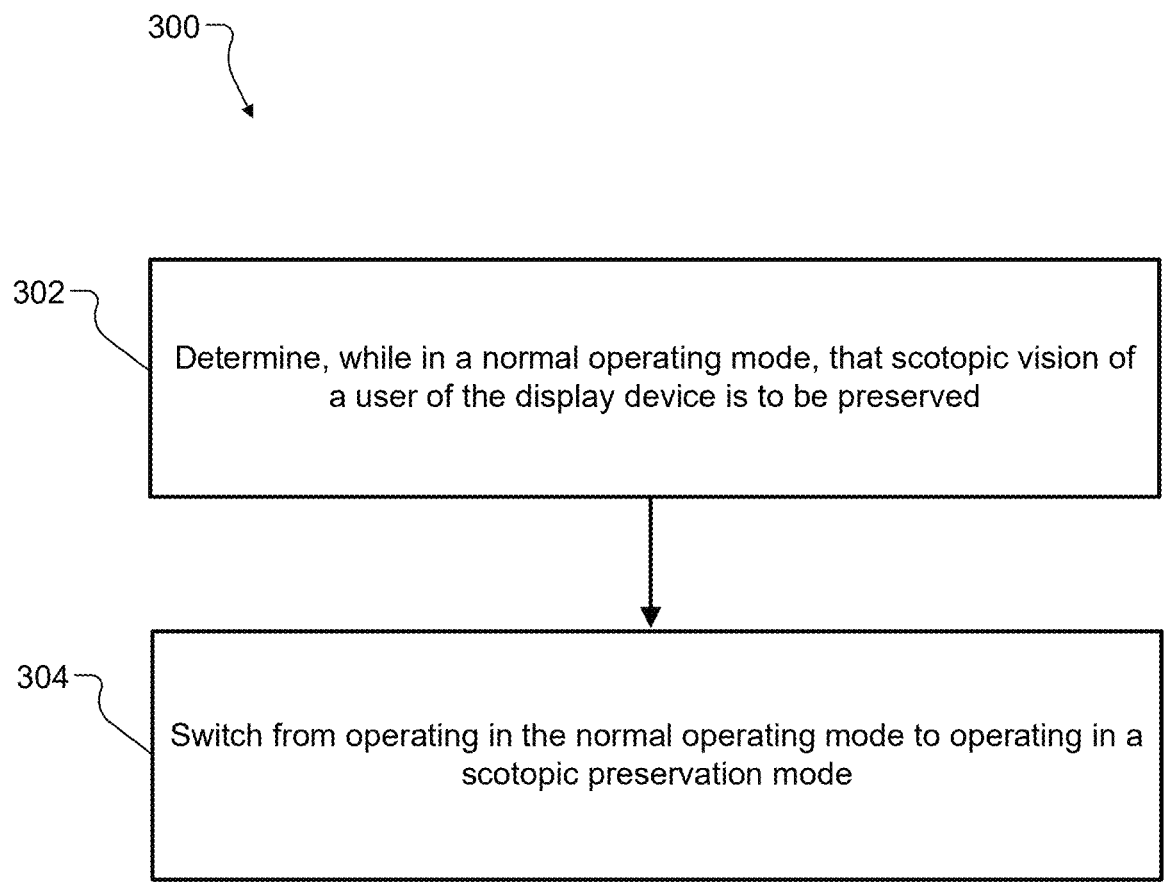
FIG. 3 shows an illustrative method for preserving scotopic vision for a display device user in accordance with principles described herein.

FIG. 3 shows an illustrative method 300 for preserving scotopic vision for a user of a display device (e.g., user 104 of display device 102) in accordance with principles described herein. The process embodied by method 300 represents one sequence of operations that may be performed by an implementation of display device 102. For example, method 300 may be embodied in instructions 206 and display device 102 may perform 300 by executing these instructions 206. While FIG. 3 shows illustrative operations 302-304 according to one implementation, it will be understood that other implementations of method 300 could omit, add to, reorder, and/or modify any of the operations of method 300. Each of operations 302 and 304 of method 300 will now be described in more detail as the operations may be performed by an implementation of display device 102 as it is used by a user.

At operation 302, display device 102 may determine, as display device 102 operates in a normal operating mode (e.g., normal operating mode 100-1), that scotopic vision of the user of display device 102 is to be preserved. In the normal operating mode, color parameter 208 may be set to cause display 202 of display device 102 to present image content in full color and additional parameter 210 may be set to a first setting. As a few examples, if additional parameter 210 is a sound output parameter that controls non-private sound produced by display device 102, the first setting may allow display device 102 to produce non-private sound, or if additional parameter 210 is a notification parameter that controls visual notifications presented on display 202 of display device 102, the first setting may allow notifications to be presented on display 202 (other example parameters have been mentioned and will be described in more detail below). The determination of operation 302 may be made in any suitable way, such as by detecting user input indicative of direction from the user to preserve the user's scotopic vision or by automatically predicting or determining a likelihood that the user has achieved scotopic vision that the user likely desires to preserve. Various examples of algorithms and bases for the determination of operation 302 will be described in more detail below.

At operation 304, display device 102 may switch display device 102 from operating in the normal operating mode to operating in a scotopic preservation mode. For example, the switch at operation 304 may be performed based on (e.g., in response to) the determination at operation 302 that the scotopic vision is to be preserved. In contrast to the normal operating mode, color parameter 208 may be set, in the scotopic preservation mode, to cause display 202 to present the image content in red color. More particularly, for example, display 202 may present the image content in the red color by presenting the image content using only light with a wavelength greater than 600 nm, greater than 615 nm, greater than 630 nm, or another suitable cutoff in or near the range of red shades of color. This conversion to presenting only red light may be performed by turning off green and blue elements of a red-green-blue (RGB) color scheme (e.g., disabling green and blue LEDs of a micro-LED pixel panel that generates display light for display 202) or by otherwise disabling green and blue frequencies or reducing the color temperature of the display into the red spectrum. The additional parameter 210 may also be set, in the scotopic preservation mode, to a second setting that is different from the first setting. For instance, referring to the examples above, if additional parameter 210 is the sound output parameter, the second setting may disallow (i.e., suppress, turn off, etc.) display device 102 from producing the non-private sound, or if additional parameter 210 is the notification parameter, the second setting may disallow notifications from being presented on display 202.

As will be described in more detail below, certain implementations may involve a non-transitory computer-readable medium storing instructions (e.g., instructions 206) that, when executed, cause a processor of a display device (e.g., processor 212 of display device 102) to perform a process comprising operations 302 and 304 of method 300 or other similar operations described herein.

While method 300 represents a switch in one direction between modes (e.g., switch 120 from normal operating mode 100-1 to scotopic preservation mode 100-2), it will be understood that a similar method may be performed to switch in the opposite direction (i.e., from scotopic preservation mode 100-2 to normal operating mode 100-1). Additionally, it will be understood that additional operations may be added to method 300 to switch back when it is no longer appropriate to try to preserve the scotopic vision. For example, an additional operation (not explicitly shown in FIG. 3) may be appended to method 300 in which display device 102 determines, while operating in the scotopic preservation mode, that scotopic vision of the user is no longer to be preserved (e.g., because the user has already lost the scotopic vision, because the lighting conditions are no longer such that the scotopic preservation mode is helpful, etc.). Based on this determination that the scotopic vision is not to be preserved, display device 102 may then switch from operating in the scotopic preservation mode back to operating in the normal operating mode.

FIGS. 4A-4D show how illustrative parameters of a display device may be changed to implement a switch from a normal operating mode to a scotopic preservation mode in accordance with principles described herein. More particularly, each of FIGS. 4A-4D show a switch 120 from a particular normal operating mode 100-1 (e.g., normal operating mode 100-1A in FIG. 4A, normal operating mode 100-1B in FIG. 4B, normal operating mode 100-1C in FIG. 4C, and normal operating mode 100-1D in FIG. 4D) to a particular scotopic preservation mode 100-2 (e.g., scotopic preservation mode 100-2A in FIG. 4A, scotopic preservation mode 100-2B in FIG. 4B, scotopic preservation mode 100-2C in FIG. 4C, and scotopic preservation mode 100-2D in FIG. 4D). In each example illustrated in FIGS. 4A-4D, color parameter 208 is shown to be switched from a full color setting ("Full Color") to a red-only setting ("Red Color") to thereby keep display 202 from presenting light that would degrade the user's scotopic vision. Additionally, each of the examples illustrated in FIGS. 4A-4D features a different example of an additional parameter 210 that is shown to also be changed as part of the switch 120 to the scotopic preservation mode 100-2. While slider switches are depicted in FIGS. 4A-4D to show the parameter settings in an illustratively convenient way, it will be understood that the parameters may be stored and set more abstractly (e.g., as variables or other data structures in memory 204, etc.) in various implementations of display device 102. Each of the additional parameter 210 examples will now be described in more detail with respect to FIGS. 4A-4D.

Figure 4A:
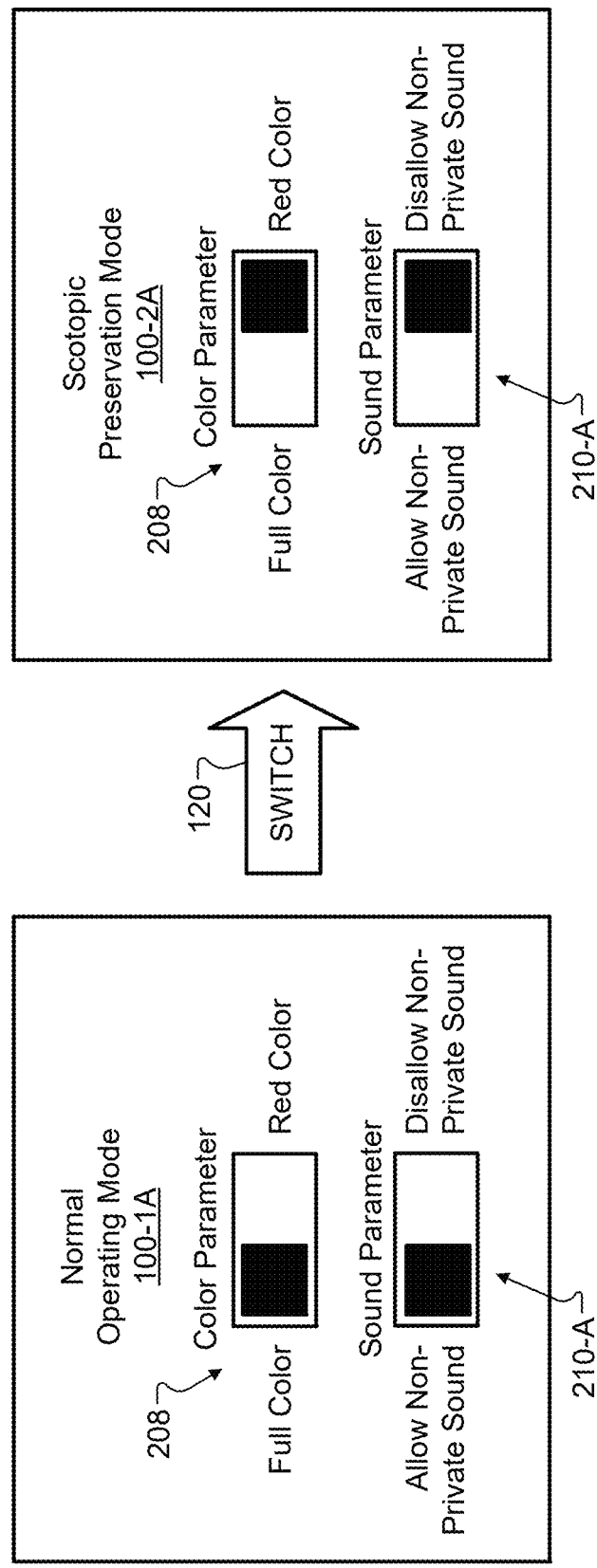
FIGS. 4A-4D show how illustrative parameters of a display device may be changed to implement a switch from a normal operating mode to a scotopic preservation mode in accordance with principles described herein.

In FIG. 4A, the additional parameter is shown to be implemented by a sound parameter 210-A that controls non-private sound produced by display device 102. For example, as mentioned above, non-private sound may refer to sound that is presented in a manner that it is likely to be heard (or intended to be heard) not only by the user of display device 102 but also by others in the vicinity. Non-private sound therefore contrasts with private sound, which is likely to be heard (or is intended to be heard) only by the user of the display device. For example, non-private sound may be presented on a loudspeaker of the device while private sound may be presented only on headphones connected to the device or on speakers that are configured to be positioned at the user's ear canal for private listening. As shown in FIG. 4A, the first setting to which sound parameter 210-A is set in normal operating mode 100-1A may allow display device 102 to produce non-private sound. The second setting to which sound parameter 210-A is set in scotopic preservation mode 100-2A is then shown to disallow display device 102 from producing the non-private sound. For example, as has been described, suppressing or disallowing sound in this way may enhance certain scotopic vision activities (e.g., hunting, fishing, etc.) or allow the user to better focus and immerse themselves in the activity (e.g., for stargazing, falling asleep, etc.).

Figure 4B:
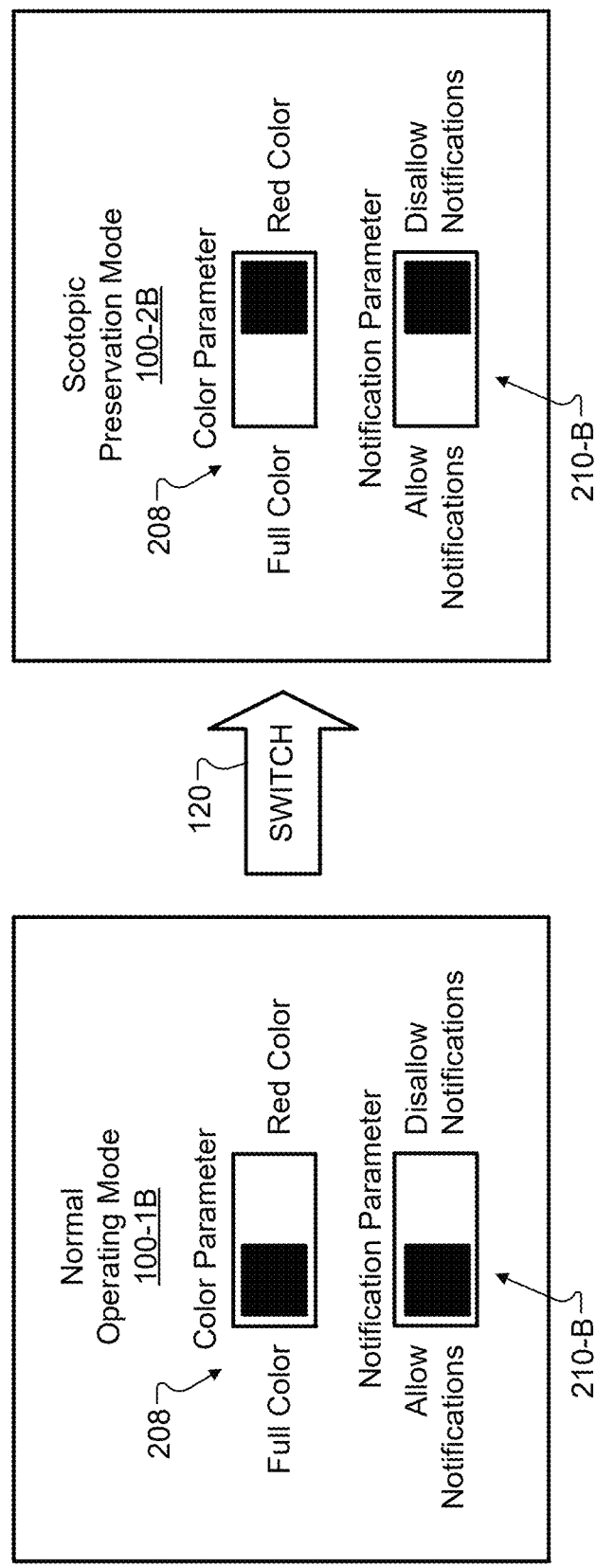

In FIG. 4B, the additional parameter is shown to be implemented by a notification parameter 210-B that controls visual notifications presented on display 202 of display device 102. For example, visual notifications may refer to any pop-up notifications, drop-down notifications, banner notifications, or other disruptive content that may be presented on display 202 at a time or in a way that is unlikely to be anticipated by the user or to relate to other activities that the user may be engaged in. While notification content may be useful and desirable when a display device 102 is operating in a normal operating mode, such content may be disruptive and unwanted during many activities associated with scotopic vision. Accordingly, as shown in FIG. 4B, the first setting to which notification parameter 210-B is set in normal operating mode 100-1B may allow notifications to be presented on display 202 of display device 102. The second setting to which notification parameter 210-B is set in scotopic preservation mode 100-2B is then shown to disallow the notifications from being presented on display 202. Similarly as described in relation to the non-private sounds above, suppressing or disallowing notifications in this way may enhance certain scotopic vision activities and facilitate better concentration, focus, and performance at these activities.

Figure 4C:
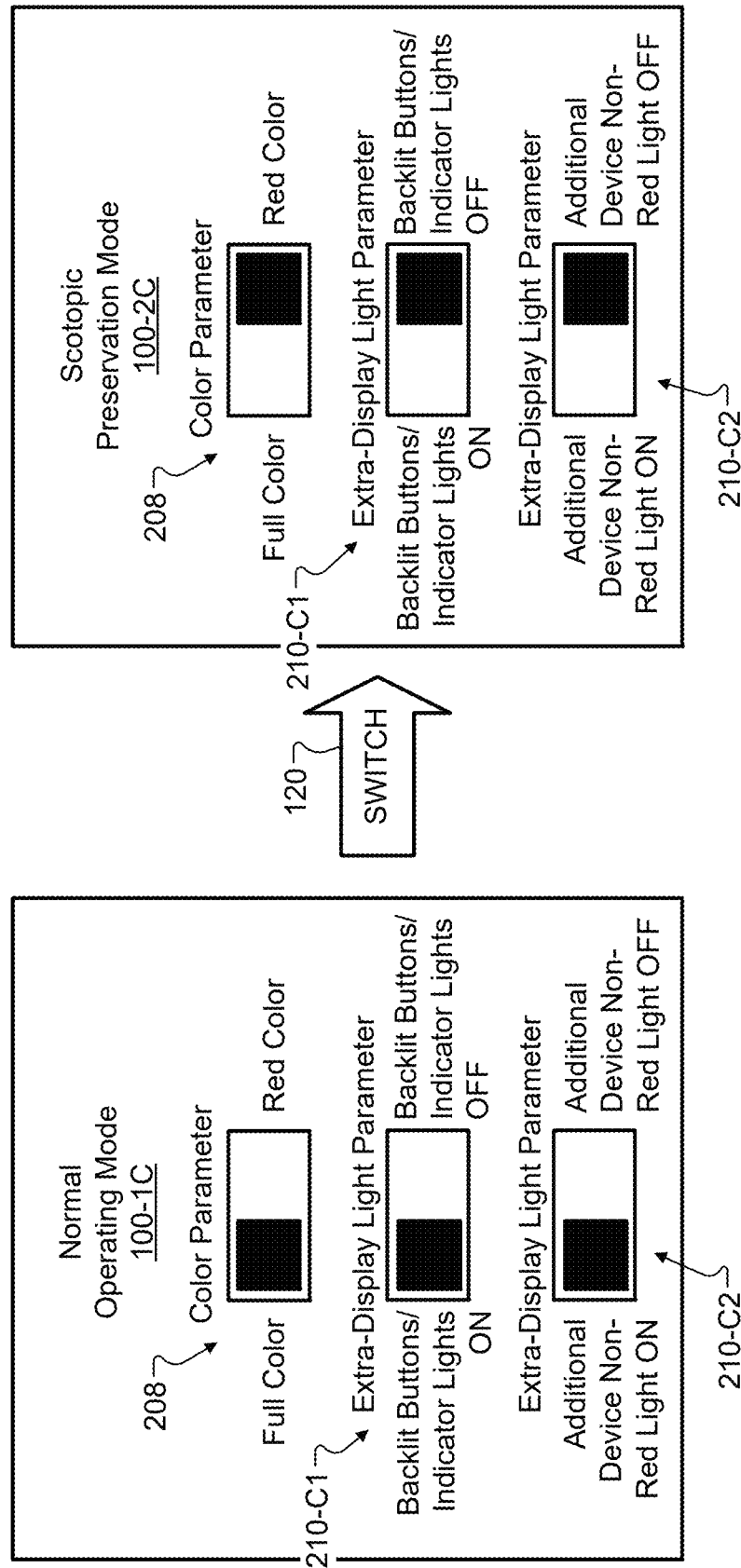

In FIG. 4C, the additional parameter is shown to be implemented by two illustrative extra-display light parameters 210-C1 and 210-C2 that each control light emission of an extra-display light source (i.e., a light source that that is associated with display device 102 but is separate from display 202). As one example illustrated by extra-display light parameter 210-C1, the extra-display light source may be an indicator light (e.g., a power LED, a network connection LED, etc.) or a backlit button on display device 102. As another example illustrated by extra-display light parameter 210-C2, the extra-display light source may be an additional device that is separate from display device 102. For instance, the additional device may be associated with the display device by being communicatively coupled with display device 102 and being under the control or influence of display device 102. For instance, if display device 102 is a head-mounted display device, the additional device may be a smart watch, a controller device (e.g., a ring, a handheld controller, etc.), a smartphone or other portable device, or another such device that may emit its own light unless instructed by display device 102 to cease doing so. Additional devices associated with display device 102 may not have their own scotopic vision determination systems configured to determine when scotopic vision is to be preserved (e.g., as display device 102 may do when performing operation 302 for example). However, based on communication from display device 102, these devices too may cease emitting light (e.g., non-red light) that risks degrading the user's scotopic vision.

As shown in FIG. 4C, the first setting to which both extra-display light parameters 210-C1 and 210-C2 are set in normal operating mode 100-1C may allow extra-display light sources to emit light (i.e., to be enabled or turned on). As shown, for instance, extra-display light parameter 210-C1 is set such that "Backlit Buttons/Indicator Lights" are "ON", and extra-display light parameter 210-C2 is set such that "Additional Device Non-Red Light" is "ON". The second setting to which both extra-display light parameters 210-C1 and 210-C2 are set in scotopic preservation mode 100-2C is then shown to disallow the extra-display light sources from emitting the light (i.e., to be disabled or turned off). As shown, for instance, extra-display light parameter 210-C1 is set such that "Backlit Buttons/Indicator Lights" are "OFF", and extra-display light parameter 210-C2 is set such that "Additional Device Non-Red Light" is "OFF". In other words, the light disallowed from being emitted by the additional device when parameter 210-C2 is in the second setting includes non-red light (e.g., such that, in some cases, the additional device may continue to present visual content using only red frequencies, rather than being completely darkened).

Figure 4D:
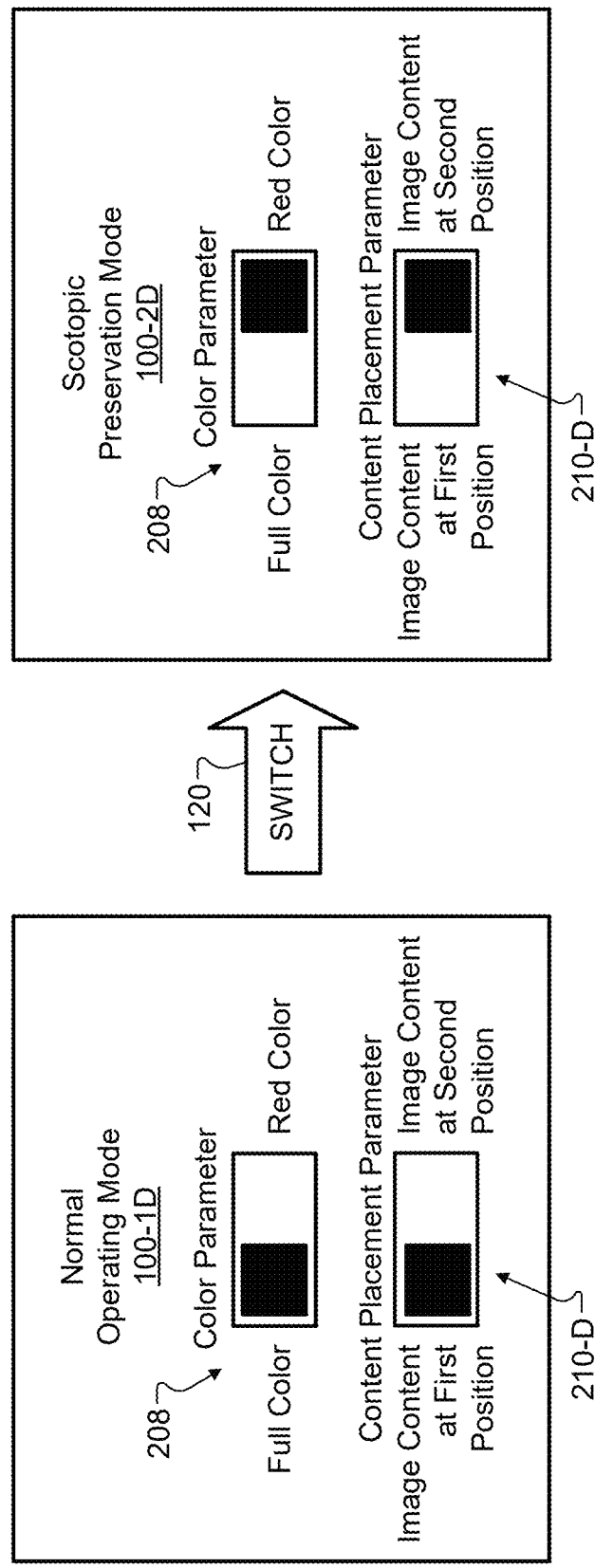

In FIG. 4D, the additional parameter is shown to be implemented by a content placement parameter 210-D that influences placement of the image content presented on display 202 of display device 102. For example, as described above and illustrated in relation to FIG. 1, it may be desirable in the normal operating mode for color content to be centrally located on the display where the content can be more readily viewed (and the color appreciated) by the cone cells used in photopic vision. Conversely, it may be desirable in the scotopic preservation mode for certain visual content to be placed nearer the periphery of the display where the content can be more readily viewed by the rod cells used in scotopic vision. Accordingly, as shown in FIG. 4D, the first setting to which content placement parameter 210-D is set in normal operating mode 100-1D may cause an element of the image content to be presented at a first position (e.g., a relatively centralized position) on display 202 of display device 102. The second setting to which content placement parameter 210-D is set in scotopic preservation mode 100-2D may then cause the element of the image content to be presented at a second position on display 202, where the second position is closer to a periphery of display 202 than the first position. By structuring visual content (e.g., user interfaces, notifications, etc.) in different ways for the two different modes 100-1D and 100-2D, the user may be able to comfortably and clearly view the content regardless of how their eyes may be adapted (e.g., to photopic vision or to scotopic vision) and regardless of the type of photoreceptor cells their vision is largely relying on (e.g., cones or rods).

While each of FIGS. 4A-4D show only one particular type of additional parameter 210 (e.g., a sound parameter 210-A, a notification parameter 210-B, a set of extra-display light parameters 210-C1 and 210-C2, or a content placement parameter 210-D), it will be understood that two or more of these parameters may be combined in any suitable way to implement scotopic preservation mode 100-2. For instance, certain implementations of scotopic preservation mode 100-2 may include changing the settings for all the additional parameters 210 described in relation to FIGS. 4A-4D, while other implementations may include changing the settings for one parameter or a subset of these and/or other suitable parameters in any combination.

As mentioned above in relation to switch 120 illustrated in FIG. 1 and operation 302 described in relation to FIG. 3, a variety of factors, conditions, considerations, and/or other determinations may each be used as a basis for determining that a user is likely to be using their scotopic vision and/or that the scotopic vision of the user otherwise is to be preserved. Accordingly, FIGS. 5A and 5B show illustrative bases that may be used in making the determination (e.g., of operation 302) that the scotopic vision of a user (e.g., user 104) is to be preserved by way of a scotopic preservation mode (e.g., scotopic preservation mode 100-2) in accordance with principles described herein.

Figure 5A:
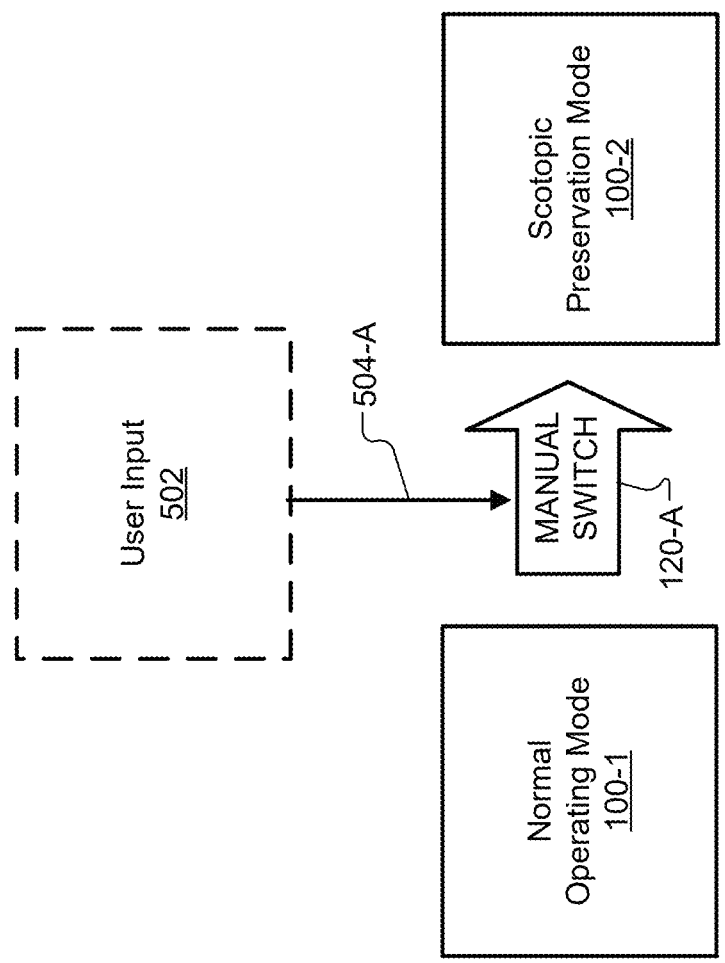
FIGS. 5A-5B show illustrative bases that may be used to determine that scotopic vision of a user is to be preserved by way of a scotopic preservation mode in accordance with principles described herein.
Figure 5B:
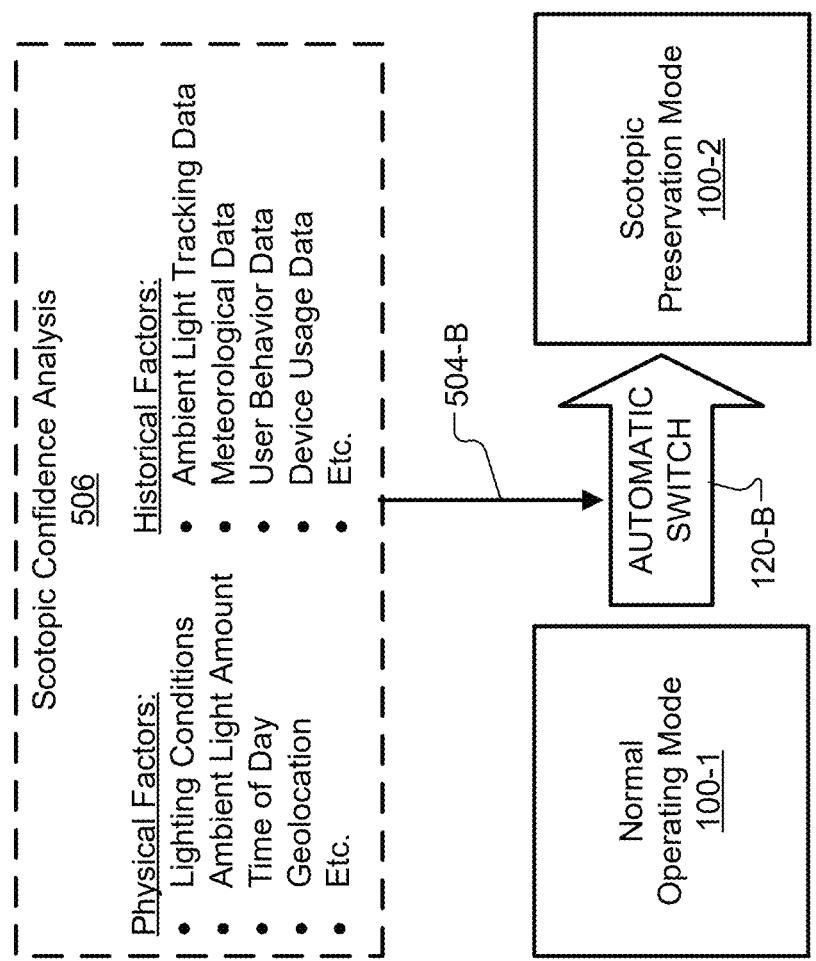

More particularly, in FIG. 5A, user input 502 is shown to support a determination 504-A that a manual switch 120-A from normal operating mode 100-1 to scotopic preservation mode 100-2 is to be performed. User input 502 may be received from user 104 whenever user 104 desires to manually trigger a switch to scotopic preservation mode 100-2. In some examples, this user input may involve the user viewing display content (e.g., manually selecting the scotopic preservation mode from a settings menu, etc.). In other examples, however, user input 502 may be received that does not require the user to view display 202 while display device 102 is still operating in normal operating mode 100-1 (since doing so may, by itself, degrade or spoil the user's scotopic vision in the very act of trying to set the device to preserve that scotopic vision). For example, user input 502 may include a voice command (e.g., "turn on red mode"), a physical button or switch, a tactile command (e.g., a shortcut action such as double tapping the side of the device, etc.), or other suitable user input that indicates that manual switch 120-A is to be performed without requiring the user to be exposed to non-red light from the display that could degrade their scotopic vision.

In other examples, user input 502 may represent instruction to the display device that was received from the user ahead of time. For instance, as the user makes plans for a scotopic vision activity (e.g., hunting, stargazing, etc.) during the day, the user may, while they are planning and thinking about it, schedule the scotopic preservation mode to engage at a certain time (e.g., starting at 10:30 pm tonight, from 9 pm to 11 pm tomorrow, etc.). In this example, the display device may switch modes without further direction from the user, but the switch may still be considered an example of a manual switch 120-A since the switch is based entirely on user input 502 and not on other factors such as will be described below.

While a manual switching of modes such as manual switch 120-A in FIG. 5A may offer a desirable degree of control and flexibility to the user, certain implementations may additionally or alternatively provide other switching bases for cases in which the user may not plan ahead or be cognizant that their mode of vision has adapted from photopic to scotopic. As mentioned above, it can be a significant challenge faced by users of display devices that one accidental viewing of a display screen (e.g., looking at a phone to check the time without thinking about it, receiving a pop-up notification on a transparent display, etc.) can immediately compromise scotopic vision that may take significant time (e.g., up to 30 minutes) to re-obtain. Accordingly, it may be desirable for a display device to monitor various data and signals that could serve as indicators or clues that scotopic vision may be underway and to automatically switch to the scotopic preservation mode whenever a particular likelihood threshold is met that predicts that the scotopic vision is being used.

To illustrate, FIG. 5B shows illustrative bases other than user input that may be used to predict or automatically determine that scotopic vision of a user is to be preserved by way of a scotopic preservation mode. Various factors may be considered, for instance, to determine whether the scotopic preservation mode is likely to be desirable when it is not clear that either: 1) the user definitely would not benefit from a scotopic preservation mode (e.g., due to there being large amounts of bright, non-red light in the environment that would preclude the user from using scotopic vision anyway), or 2) the user definitely would benefit from the scotopic preservation mode (e.g., due to an explicit request or the environment having been dark for a long period of time in an outdoor scene in the middle of the night). In between these clearer situations, a large array of potential circumstances may exist where it is not clear whether the scotopic preservation mode is desired or useful. For various permutations of such circumstances, FIG. 5B shows example factors for a scotopic confidence analysis 506 that may be performed (e.g., while the display device operates in normal operating mode 100-1) to make a determination 504-B that scotopic vision of the user of the display device is to be preserved and, hence, that an automatic switch 120-B to the scotopic preservation mode 100-2 is to be performed. For example, determination 504-B may result from determining that a scotopic confidence value meets a threshold (e.g., based on scotopic confidence analysis 506). The scotopic confidence value may represent, for instance, a likelihood that the user has adapted to using scotopic vision, where the likelihood is based on one or more of the physical or historical factors shown in scotopic confidence analysis 506, which will now be described.

As shown, scotopic confidence analysis 506 may account for any or all of a variety of physical factors that may be associated with data received by sensors included in the display device 102. For instance, such sensors may include a camera (e.g., a world-facing camera), an ambient light sensor, a real-time clock, a geolocation sensor, or the like.

As shown, a first physical factor accounted for in the analysis may be lighting conditions detected using the camera. These lighting conditions may include, for instance, the color of light detected by the camera (e.g., such that red light produced by a distant campfire is weighted differently from white light produced by a nearby lantern or flashlight, etc.), the prevalence of light sources in the environment (e.g., such that distant and dim light such as the moon and stars are weighted differently from bright or nearby lights such as street lights or car headlights, etc.), and so forth.

Another physical factor accounted for in scotopic confidence analysis 506 may be an amount of ambient light detected by the ambient light sensor. For example, this factor may indicate in general how well-illuminated a particular scene is, such that it may be a good indicator of whether the user is indoors or outdoors, whether it is daytime or nighttime, and so forth.

Another physical factor accounted for in the analysis may be a time of day indicated by the real-time clock. For instance, it may be more likely that scotopic preservation mode is desired at nighttime than during daytime hours. The time of day combined with the amount of ambient light and/or other information may also help the device to accurately assess if the user is likely to be located indoors or outdoors or how long a low level of ambient light has persisted (e.g., to determine if the low light conditions have persisted long enough for the user to have partially or fully adapted to scotopic vision).

Yet another physical factor that may be accounted for in scotopic confidence analysis 506 is a geolocation of the display device indicated by the geolocation sensor. For example, a geolocation could be analyzed (e.g., with respect to a location database) to help determine whether the user is indoors or outdoors, is in an urban environment (e.g., with street lamps, etc.) or a rural environment (e.g., with little or no ambient illumination), and so forth. For example, a geolocation may indicate that the user and the display device are located at an outdoor football stadium during a game that may reasonably anticipated to be brightly lit or the geolocation may indicate that the user is in a remote area away from civilization that may be reasonably anticipated to be very dark at night.

As further shown in FIG. 5B, scotopic confidence analysis 506 may also account for any of a variety of historical or behavioral factors that may be associated with previous observations or information that can be accessed (e.g., from the internet, from a database, etc.) without measuring the information directly using a sensor.

For example, a first historical factor may include ambient light tracking data that indicates ambient light conditions over a time period immediately preceding a present time. As mentioned above, for example, by tracking sensor data from the real-time clock and the camera or ambient light sensor, display device 102 may accumulate information that indicates not only that it is dark at the present time, but that it has been dark, for example, for at least the last 20 minutes or 30 minutes or the like. This information may be useful (along with present physical conditions) since it may be undesirable for automatic switch 120-B to be performed too readily or without sufficient hysteresis (e.g., switching back and forth when a user walks into different rooms with varying amounts of light that actually have little effect on the user's light adaptation).

Another historical factor may include meteorological data indicating natural conditions at and/or around the present time (e.g., leading up to the present time, anticipated in the near future, etc.). For instance, meteorological information may be accessed (e.g., from a weather site on the Internet, from a database, etc.) that can indicate whether the moon is new or full, what time sunset and/or sunrise occurred or are anticipated to occur, whether there is or is likely to be cloud cover blocking sunlight, moonlight, or starlight, and so forth.

Yet another historical factor may include user behavior data indicating a prior action performed by the user. For example, the user may habitually engage the scotopic preservation mode at a certain time of day or on a certain night of the week or month and this factor may involve identifying patterns and anticipating the user's actions before the user manually directs the mode switch (or in the event they forget). In some cases, display device 102 may further assess what other users have done under similar circumstances (e.g., whether users tend to engage or disengage the scotopic preservation mode at this time of day in this location, etc.).

Yet another historical factor that may be accounted for in the analysis is device usage data indicating usage of the display device by the user over a time period. For example, the display device 102 may track how recently it has been used for non-scotopic-vision-related functions or whether it has been idle for a long period of time.

As mentioned above, all of these and/or other suitable factors accounted for by scotopic confidence analysis 506 may be combined and weighted together to determine a likelihood that the user has achieved the scotopic vision and desires to preserve the scotopic vision. Whatever the likelihood is determined to be, the scotopic confidence value representing the likelihood may be compared to a predetermined threshold in order for determination 504-B to trigger automatic switch 120-B to scotopic preservation mode 100-2. This threshold may be set to any level as may serve a particular implementation. For instance, it may be desirable to set the threshold relatively low so that any doubt about whether the user is adapted to use scotopic vision or desires to preserve scotopic vision is resolved in favor of an assumption that they are. Defaulting to an assumption of scotopic vision (or at least erring or resolving doubt on the side of this assumption) may be desirable since it may be less costly to a user to manually correct the device and switch back to normal operating mode 100-1 than to lose their scotopic vision by glimpsing a full-color display and have to start over on trying to build it back up.

FIGS. 5A and 5B have illustrated two types of transitions from normal operating mode 100-1 to scotopic preservation mode 100-2: a manual switch 120-A and an automatic switch 120-B. While these examples show the mode transition only in one direction, it will be understood that similar transition options may exist to return back from scotopic preservation mode 100-2 to normal operating mode 100-1. That is, when display device 102 is in the scotopic preservation mode 100-2, a user may manually transition back to normal operating mode 100-1 by providing user input directing the device in this regard or the display device may determine that the scotopic preservation mode is no longer appropriate and may transition to the normal operating mode automatically based on a similar analysis as described above in relation to scotopic confidence analysis 506.

Figure 6A:
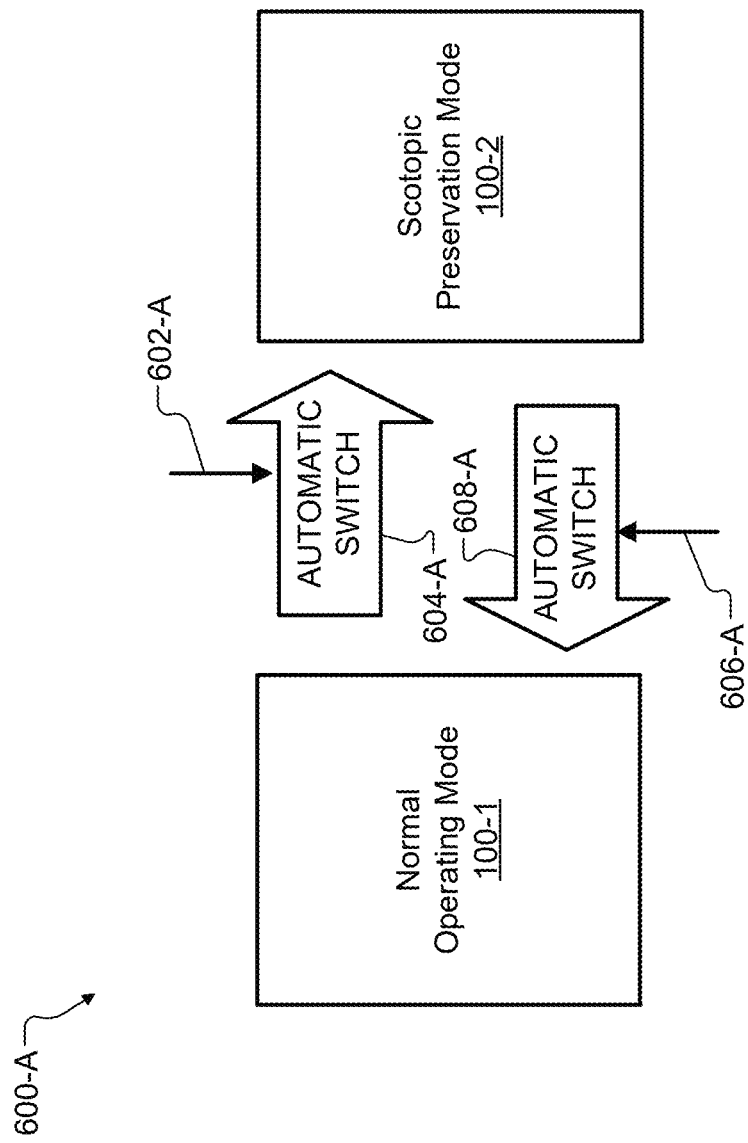
FIGS. 6A-6D show illustrative switching scenarios that may be used by implementations described herein to switch between a normal operating mode and a scotopic preservation mode in accordance with principles described herein.

To illustrate examples of how the modes may be transitioned between, FIGS. 6A-6D show illustrative switching scenarios that may be used by implementations described herein to switch between normal operating mode 100-1 and scotopic preservation mode 100-2 in accordance with principles described herein. More particularly, as shown, FIG. 6A shows a switching scenario 600-A involving a determination 602-A to make an automatic switch 604-A to scotopic preservation mode 100-2 and a determination 606-A to make another automatic switch 608-A back to normal operating mode 100-1. In this switching scenario, both determinations may be made using the type of analysis described above (i.e., scotopic confidence analysis 506) such that the user need not be burdened with providing explicit input to switch modes in either direction since the system behaves fully automatically. Along with freeing up the user from thinking about the mode that is most appropriate, this scenario may also facilitate the scotopic preservation mode 100-2 to not only preserve existing scotopic vision but also to encourage and facilitate scotopic adaptation in the first place. For example, the user may initiate a navigation app from a well-lit room prior to a hike on a dark path. Though the physical conditions in the room when the navigation is initiated may not be such as to suggest that scotopic vision needs to be preserved, the display device may make determination 602-A to perform automatic switch 604-A anyway so as to help the user achieve scotopic vision as soon as possible as they begin the hike. Similarly, the user that is using device navigation to drive a boat at night could benefit from an automatic transition to scotopic preservation mode 100-2 immediately after sunset if no ambient blue or green lights are detected.

Figure 6B:
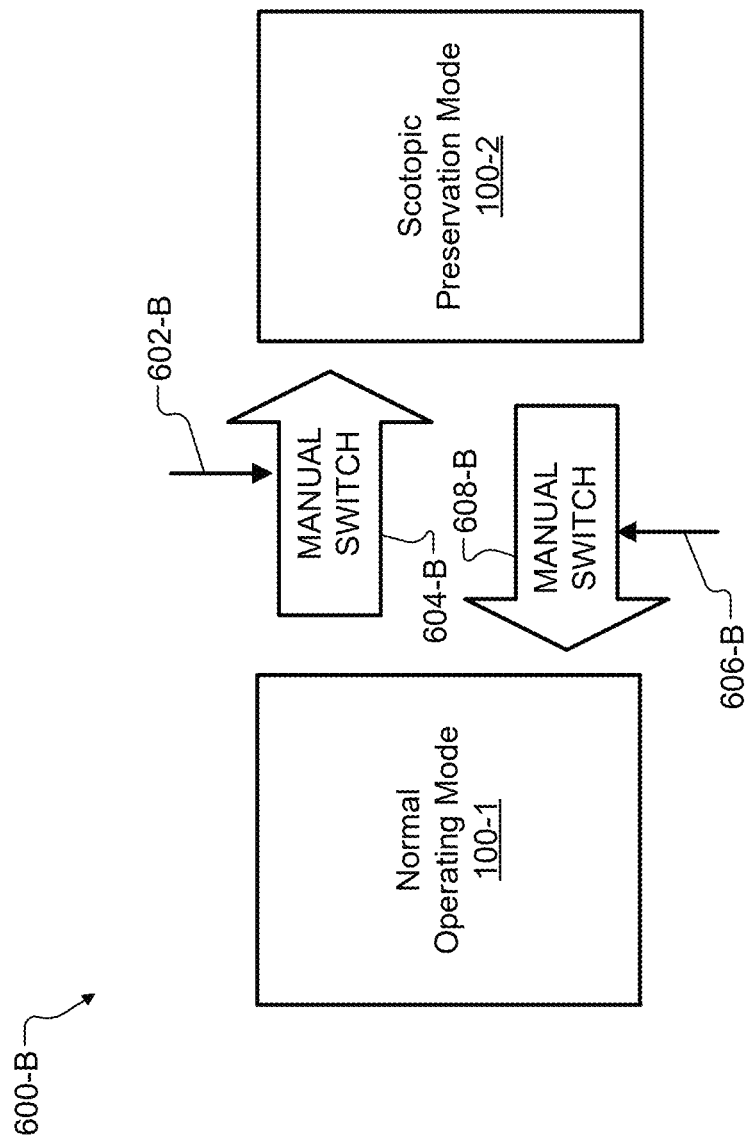

FIG. 6B shows a switching scenario 600-B involving a determination 602-B to make a manual switch 604-B to scotopic preservation mode 100-2 and a determination 606-B to make another manual switch 608-B back to normal operating mode 100-1. In this switching scenario, both determinations 602-B and 606-B may be based entirely on explicit user input such that the user enjoys complete control of the operating mode without the display device performing automatic switching between modes. This may be helpful, for example, if the user wishes to plan ahead for a particular activity that is scheduled during a specific range of time. This type of scenario also may be preferred by a user who is highly conscientious about their mode of vision such that they prefer to exert precise manual control rather than relying on algorithmic or automatic determinations to switch between modes.

Figure 6C:
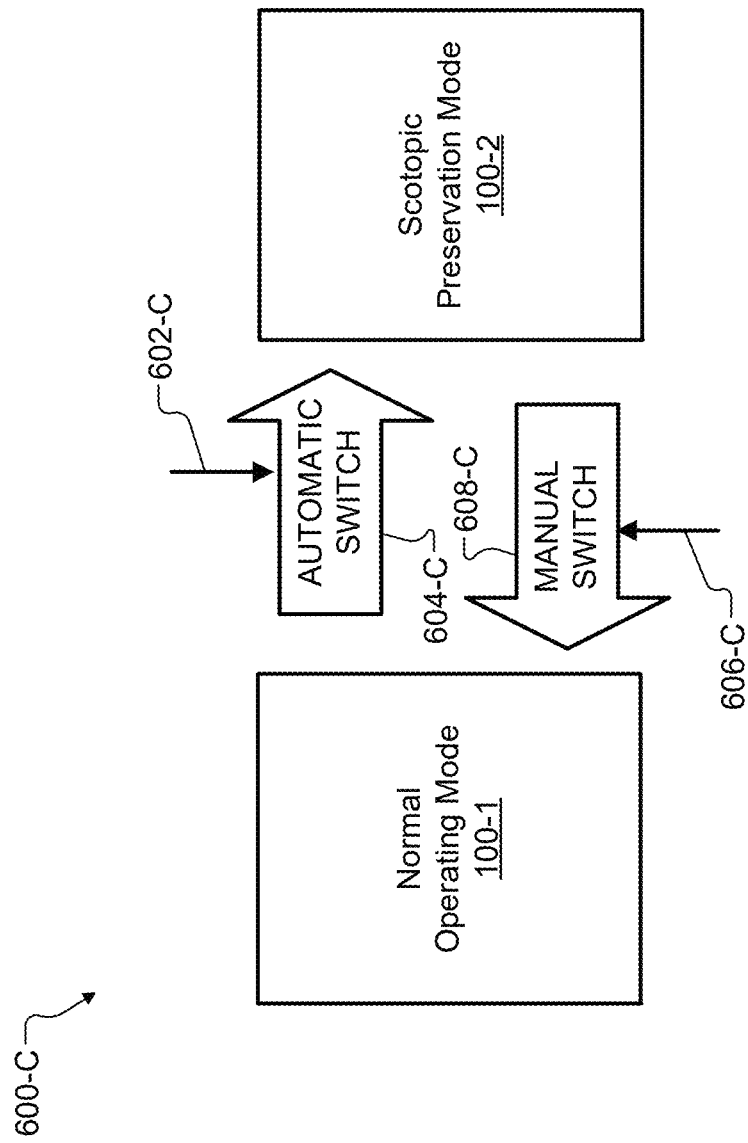

FIG. 6C shows a switching scenario 600-C involving a determination 602-C to make an automatic switch 604-C to scotopic preservation mode 100-2 and a determination 606-C to make a manual switch 608-C back to normal operating mode 100-1. This switching scenario may occur in cases, such as described above, where a threshold is set relatively low or scotopic vision is assumed as a default when there is any doubt about what type of vision the user is adapted to. For example, even if the scotopic confidence value indicates a 20% chance (or less) that the user would benefit from the scotopic preservation mode, determination 602-C may cause automatic switch 604-C to trigger so that the potential scotopic vision of the user, in the event that scotopic vision has been achieved, will be preserved. In the fairly likely event (80% likely in this example) that the user is not actually desiring the scotopic preservation mode, it may be trivial and convenient for the user to manually indicate that, in fact, they currently prefer the normal operating mode. For example, determination 606-C may be made based on user input such as a double tap, an answer to a red-mode prompt informing the user that scotopic preservation mode 100-2 has been engaged, a convenient voice command ("cancel red-mode" or "go full color"), or the like. In some examples, the scotopic preservation mode may be presumed for a period of time that the user may be prompted to confirm (e.g., "click OK within 10 seconds to stay in red mode"), such that the user input leading to determination 606-C may be the user's abstaining from providing requested input and letting the prompt time out.

Figure 6D:
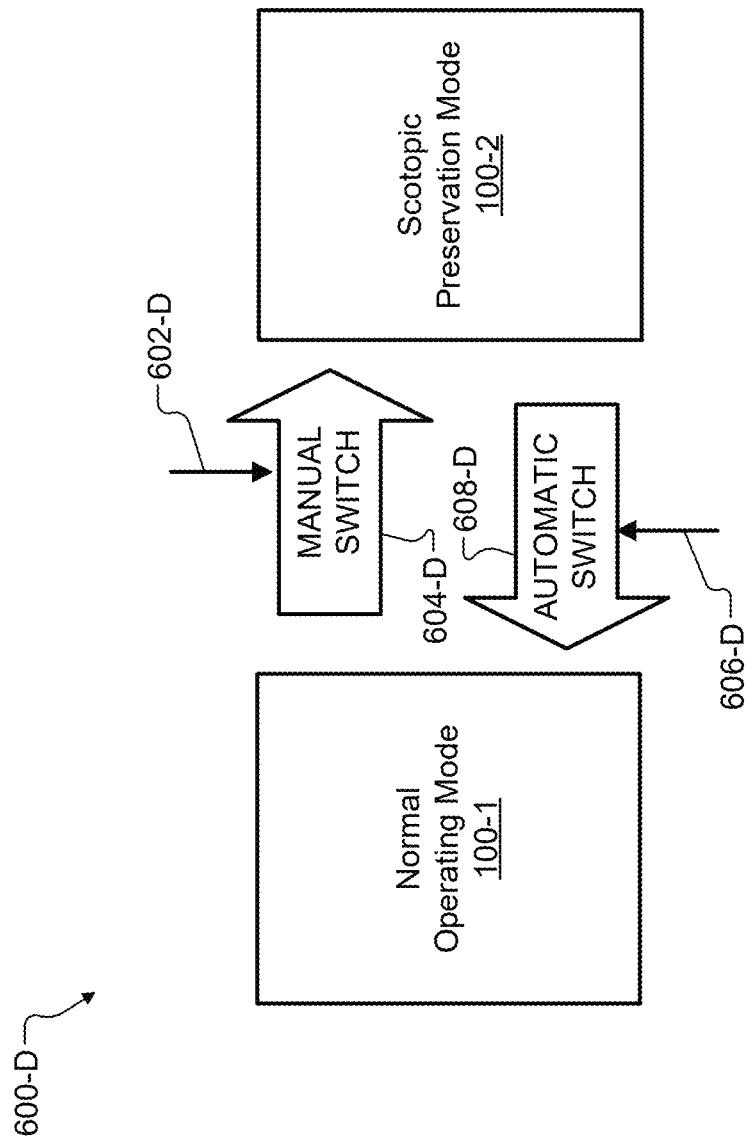

FIG. 6D shows a switching scenario 600-D involving a determination 602-D to make a manual switch 604-D to scotopic preservation mode 100-2 and a determination 606-D to make an automatic switch 608-D back to normal operating mode 100-1. In this switching scenario, the user may manually indicate when they want to engage the scotopic preservation mode but may not bother or remember to leave it later (though it may be clear at a later time that the scotopic preservation mode is no longer appropriate). For instance, the user may manually engage scotopic preservation mode 100-2 for an early morning fishing trip and the display device may automatically detect ambient greens and blues that lead to determination 606-D as the sun comes up and it is clear that the user is no longer relying on their scotopic vision. Similarly, a device that is manually set to use scotopic preservation mode for nighttime activities may be configured to automatically revert to the normal operating mode 100-1 when it is used again the next morning after sunrise.

As has been mentioned, various methods and processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

FIG. 7 shows an illustrative computing system 700 that may be used to implement various devices and/or systems described herein. For example, computing system 700 may include or implement (or partially implement) display devices such as implementations of display device 102 described herein, additional devices such as described herein, and/or any components thereof or other systems or devices used therewith.

As shown in FIG. 7, computing system 700 may include a communication interface 702, a processor 704, a storage device 706, and an input/output (I/O) module 708 communicatively connected via a communication infrastructure 710. While an illustrative computing system 700 is shown in FIG. 7, the components illustrated in FIG. 7 are not intended to be limiting. Additional or alternative components may be used in other embodiments. Components of computing system 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. One or more I/O modules may be used to receive input for a single virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

The following examples describe implementations for preserving scotopic vision for a display device user in accordance with principles described herein.

1. A display device comprising: a display configured to present image content; a memory storing instructions and operating parameters for the display device, the operating parameters including a color parameter and an additional parameter; and a processor communicatively coupled to the memory and configured to execute the instructions to switch the display device between: a normal operating mode in which the color parameter is set to cause the display to present the image content in full color and the additional parameter is set to a first setting, and a scotopic preservation mode in which the color parameter is set to cause the display to present the image content in red color and the additional parameter is set to a second setting different from the first setting.

2. The display device of any of the preceding examples, wherein: the additional parameter is a sound output parameter that controls non-private sound produced by the display device; the first setting allows the display device to produce non-private sound; and the second setting disallows the display device from producing the non-private sound.

3. The display device of any of the preceding examples, wherein: the additional parameter is a notification parameter that controls visual notifications presented on the display of the display device; the first setting allows notifications to be presented on the display; and the second setting disallows the notifications from being presented on the display.

4. The display device of any of the preceding examples, wherein: the additional parameter is an extra-display light parameter that controls light emission of an extra-display light source associated with the display device and separate from the display; the first setting allows the extra-display light source to emit light; and the second setting disallows the extra-display light source from emitting the light.

5. The display device of any of the preceding examples, wherein the extra-display light source is at least one of an indicator light or a backlit button on the display device.

6. The display device of any of the preceding examples, wherein: the extra-display light source is an additional device that is separate from the display device; the additional device is associated with the display device by being communicatively coupled with the display device; and the light disallowed from being emitted by the second setting includes non-red light.

7. The display device of any of the preceding examples, wherein: the additional parameter is a content placement parameter that influences placement of the image content presented on the display of the display device; the first setting causes an element of the image content to be presented at a first position on the display; and the second setting causes the element of the image content to be presented at a second position on the display, the second position closer to a periphery of the display than the first position.

8. The display device of any of the preceding examples, wherein the processor executes the instructions to perform a process including: determining, while the display device operates in the normal operating mode, that scotopic vision of a user of the display device is to be preserved; and switching, based on the determining that the scotopic vision is to be preserved, the display device from operating in the normal operating mode to operating in the scotopic preservation mode.

9. The display device of any of the preceding examples, further comprising at least one of a camera, an ambient light sensor, a real-time clock, and a geolocation sensor; wherein the determining that the scotopic vision is to be preserved includes determining that a scotopic confidence value meets a threshold, the scotopic confidence value representing a likelihood that the user has adapted to using the scotopic vision, the likelihood based on at least one of: lighting conditions detected using the camera, an amount of ambient light detected by the ambient light sensor, a time of day indicated by the real-time clock, or a geolocation of the display device indicated by the geolocation sensor.

10. The display device of any of the preceding examples, wherein the determining that the scotopic vision is to be preserved includes determining that a scotopic confidence value meets a threshold, the scotopic confidence value representing a likelihood that the user has adapted to using the scotopic vision, the likelihood based on at least one of: ambient light tracking data indicating ambient light conditions over a time period immediately preceding a present time; meteorological data indicating natural conditions at the present time; user behavior data indicating a prior action performed by the user; or device usage data indicating usage of the display device by the user over the time period.

11. The display device of any of the preceding examples, wherein the process further includes switching, based on user input while the display device is operating in the scotopic preservation mode, the display device back to operating in the normal operating mode.

12. The display device of any of the preceding examples, wherein the processor executes the instructions to perform a process including: determining, based on user input from a user of the display device while the display device operates in the normal operating mode, that scotopic vision of the user is to be preserved; switching, based on the determining that the scotopic vision is to be preserved, the display device from operating in the normal operating mode to operating in the scotopic preservation mode; and switching, based on a determination that the scotopic vision is no longer to be preserved while the display device is operating in the scotopic preservation mode, the display device back to operating in the normal operating mode.

13. The display device of any of the preceding examples, wherein the display presents the image content in the red color by presenting the image content using only light with a wavelength greater than 600 nanometers (nm).

14. The display device of any of the preceding examples, implemented as an augmented reality head-mounted device configured to present augmented reality content; wherein the display is implemented as a transparent display configured to combine ambient light passing through the display with display light carrying the image content.

15. A method comprising: determining, by a display device operating in a normal operating mode in which a color parameter is set to cause a display of the display device to present image content in full color and an additional parameter is set to a first setting, that scotopic vision of a user of the display device is to be preserved; and switching, based on the determining that the scotopic vision is to be preserved, the display device from operating in the normal operating mode to operating in a scotopic preservation mode in which the color parameter is set to cause the display to present the image content in red color and the additional parameter is set to a second setting different from the first setting.

16. The method of any of the preceding examples, wherein the determining that the scotopic vision is to be preserved includes determining that a scotopic confidence value meets a threshold, the scotopic confidence value representing a likelihood that the user has adapted to using the scotopic vision, the likelihood based on at least one of: lighting conditions detected using a camera of the display device; an amount of ambient light detected by an ambient light sensor of the display device; a time of day indicated by a real-time clock of the display device; or a geolocation of the display device indicated by a geolocation sensor of the display device.

17. The method of any of the preceding examples, wherein the determining that the scotopic vision is to be preserved includes determining that a scotopic confidence value meets a threshold, the scotopic confidence value representing a likelihood that the user has adapted to using the scotopic vision, the likelihood based on at least one of: ambient light tracking data indicating ambient light conditions over a time period immediately preceding a present time; meteorological data indicating natural conditions at the present time; user behavior data indicating a prior action performed by the user; or device usage data indicating usage of the display device by the user over the time period.

18. A non-transitory computer-readable medium storing instructions that, when executed, cause a processor of a display device to perform a process comprising: determining, while the display device is operating in a normal operating mode in which a color parameter is set to cause a display of the display device to present image content in full color and an additional parameter is set to a first setting, that scotopic vision of a user of the display device is to be preserved; and switching, based on the determining that the scotopic vision is to be preserved, the display device from operating in the normal operating mode to operating in a scotopic preservation mode in which the color parameter is set to cause the display to present the image content in red color and the additional parameter is set to a second setting different from the first setting.

19. The non-transitory computer-readable medium of any of the preceding examples, wherein the determining that the scotopic vision is to be preserved includes determining that a scotopic confidence value meets a threshold, the scotopic confidence value representing a likelihood that the user has adapted to using the scotopic vision, the likelihood based on at least one of: lighting conditions detected using a camera of the display device; an amount of ambient light detected by an ambient light sensor of the display device; a time of day indicated by a real-time clock of the display device; or a geolocation of the display device indicated by a geolocation sensor of the display device.

20. The non-transitory computer-readable medium of any of the preceding examples, wherein the determining that the scotopic vision is to be preserved includes determining that a scotopic confidence value meets a threshold, the scotopic confidence value representing a likelihood that the user has adapted to using the scotopic vision, the likelihood based on at least one of: ambient light tracking data indicating ambient light conditions over a time period immediately preceding a present time; meteorological data indicating natural conditions at the present time; user behavior data indicating a prior action performed by the user; or device usage data indicating usage of the display device by the user over the time period.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized, or location information may be obtained (such as to a city, zip code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A display device comprising:
a display configured to present image content;
a memory storing instructions and operating parameters for the display device, the operating parameters including a color parameter and an additional parameter that controls light emission of an additional device separate from and communicatively coupled with the display device; and
a processor communicatively coupled to the memory and configured to execute the instructions to switch the display device between:
a normal operating mode in which the color parameter is set to cause the display to present the image content in full color and the additional parameter is set to allow the additional device to emit light, and
a scotopic preservation mode in which the color parameter is set to cause the display to present the image content in one particular color and the additional parameter is set to disallow the additional device from emitting light that is not the one particular color.

2. The display device of claim 1, wherein:
the operating parameters further include a sound output parameter that controls non-private sound produced by the display device;
in the normal operating mode, the sound output parameter is set to allow the display device to produce non-private sound; and
in the scotopic preservation mode, the sound output parameter is set to disallow the display device from producing the non-private sound.

3. The display device of claim 1, wherein:
the operating parameters further include a notification parameter that controls visual notifications presented on the display of the display device;
in the normal operating mode, the notification parameter is set to allow notifications to be presented on the display; and
in the scotopic preservation mode, the notification parameter is set to disallow the notifications from being presented on the display.

4. The display device of claim 1, wherein:
the additional parameter further controls light emission of at least one of an indicator light or a backlit button on the display device;
in the normal operating mode, the additional parameter is further set to allow the indicator light or the backlit button to emit light; and
in the scotopic preservation mode, the additional parameter is further set to disallow the indicator light or the backlit button from emitting light that is not the one particular color.

5. The display device of claim 1, wherein:
the operating parameters further include a content placement parameter that influences placement of the image content presented on the display of the display device;
in the normal operating mode, the content placement parameter is set to cause an element of the image content to be presented at a first position on the display; and
in the scotopic preservation mode, the content placement parameter is set to cause the element of the image content to be presented at a second position on the display, the second position closer to a periphery of the display than the first position.

6. The display device of claim 1, wherein the processor executes the instructions to perform a process including:
determining, while the display device operates in the normal operating mode, that scotopic vision of a user of the display device is to be preserved; and
switching, based on the determining that the scotopic vision is to be preserved, the display device from operating in the normal operating mode to operating in the scotopic preservation mode.

7. The display device of claim 6, further comprising at least one of a camera, an ambient light sensor, a real-time clock, and a geolocation sensor;
wherein the determining that the scotopic vision is to be preserved includes determining that a scotopic confidence value meets a threshold, the scotopic confidence value representing a likelihood that the user has adapted to using the scotopic vision, the likelihood based on at least one of:
lighting conditions detected using the camera,
an amount of ambient light detected by the ambient light sensor,
a time of day indicated by the real-time clock, or
a geolocation of the display device indicated by the geolocation sensor.

8. The display device of claim 6, wherein the determining that the scotopic vision is to be preserved includes determining that a scotopic confidence value meets a threshold, the scotopic confidence value representing a likelihood that the user has adapted to using the scotopic vision, the likelihood based on at least one of:
ambient light tracking data indicating ambient light conditions over a time period immediately preceding a present time;
meteorological data indicating natural conditions at the present time;
user behavior data indicating a prior action performed by the user; or
device usage data indicating usage of the display device by the user over the time period.

9. The display device of claim 6, wherein the process further includes switching, based on user input while the display device is operating in the scotopic preservation mode, the display device back to operating in the normal operating mode.

10. The display device of claim 1, wherein the processor executes the instructions to perform a process including:
determining, based on user input from a user of the display device while the display device operates in the normal operating mode, that scotopic vision of the user is to be preserved;
switching, based on the determining that the scotopic vision is to be preserved, the display device from operating in the normal operating mode to operating in the scotopic preservation mode; and
switching, based on a determination that the scotopic vision is no longer to be preserved while the display device is operating in the scotopic preservation mode, the display device back to operating in the normal operating mode.

11. The display device of claim 1, wherein:
the one particular color is red; and
the display presents the image content in the red color by presenting the image content using light with a wavelength greater than 600 nanometers (nm).

12. The display device of claim 1, implemented as an augmented reality head-mounted device configured to present augmented reality content;

wherein the display is implemented as a transparent display configured to combine ambient light passing through the display with display light carrying the image content.

13. A method comprising:
   determining, by a display device operating in a normal operating mode in which a color parameter is set to cause a display of the display device to present image content in full color and an additional parameter that controls light emission of an additional device separate from and communicatively coupled with the display device is set to allow the additional device to emit light, that scotopic vision of a user of the display device is to be preserved; and
   switching, based on the determining that the scotopic vision is to be preserved, the display device from operating in the normal operating mode to operating in a scotopic preservation mode in which the color parameter is set to cause the display to present the image content in one particular color and the additional parameter is set to disallow the additional device from emitting light that is not the one particular color.

14. The method of claim 13, wherein the determining that the scotopic vision is to be preserved includes determining that a scotopic confidence value meets a threshold, the scotopic confidence value representing a likelihood that the user has adapted to using the scotopic vision, the likelihood based on at least one of:
   lighting conditions detected using a camera of the display device;
   an amount of ambient light detected by an ambient light sensor of the display device;
   a time of day indicated by a real-time clock of the display device; or
   a geolocation of the display device indicated by a geolocation sensor of the display device.

15. The method of claim 13, wherein the determining that the scotopic vision is to be preserved includes determining that a scotopic confidence value meets a threshold, the scotopic confidence value representing a likelihood that the user has adapted to using the scotopic vision, the likelihood based on at least one of:
   ambient light tracking data indicating ambient light conditions over a time period immediately preceding a present time;
   meteorological data indicating natural conditions at the present time;
   user behavior data indicating a prior action performed by the user; or
   device usage data indicating usage of the display device by the user over the time period.

16. The method of claim 13, wherein:
   the one particular color is red; and
   the display presents the image content in the red color by presenting the image content using light with a wavelength greater than 600 nanometers (nm).

17. A non-transitory computer-readable medium storing instructions that, when executed, cause a processor of a display device to perform a process comprising:
   determining, while the display device is operating in a normal operating mode in which a color parameter is set to cause a display of the display device to present image content in full color and an additional parameter that controls light emission of an additional device separate from and communicatively coupled with the display device is set to allow the additional device to emit light, that scotopic vision of a user of the display device is to be preserved; and
   switching, based on the determining that the scotopic vision is to be preserved, the display device from operating in the normal operating mode to operating in a scotopic preservation mode in which the color parameter is set to cause the display to present the image content in one particular color and the additional parameter is set to disallow the additional device from emitting light that is not the one particular color.

18. The non-transitory computer-readable medium of claim 17, wherein the determining that the scotopic vision is to be preserved includes determining that a scotopic confidence value meets a threshold, the scotopic confidence value representing a likelihood that the user has adapted to using the scotopic vision, the likelihood based on at least one of:
   lighting conditions detected using a camera of the display device;
   an amount of ambient light detected by an ambient light sensor of the display device;
   a time of day indicated by a real-time clock of the display device; or
   a geolocation of the display device indicated by a geolocation sensor of the display device.

19. The non-transitory computer-readable medium of claim 17, wherein the determining that the scotopic vision is to be preserved includes determining that a scotopic confidence value meets a threshold, the scotopic confidence value representing a likelihood that the user has adapted to using the scotopic vision, the likelihood based on at least one of:
   ambient light tracking data indicating ambient light conditions over a time period immediately preceding a present time;
   meteorological data indicating natural conditions at the present time;
   user behavior data indicating a prior action performed by the user; or
   device usage data indicating usage of the display device by the user over the time period.

20. The non-transitory computer-readable medium of claim 17, wherein:
   the one particular color is red; and
   the display presents the image content in the red color by presenting the image content using light with a wavelength greater than 600 nanometers (nm).

* * * * *